United States Patent
Jiang et al.

(10) Patent No.: US 9,902,890 B1
(45) Date of Patent: Feb. 27, 2018

(54) DRILLING FLUID ADDITIVE COMPOSITION SUITABLE FOR COAL-BED GAS WELLS, AND WATER-BASED DRILLING FLUID AND USE THEREOF

(71) Applicant: China University of Petroleum (Beijing), Changping District, Beijing (CN)

(72) Inventors: Guancheng Jiang, Beijing (CN); Yinbo He, Beijing (CN); Chong Liu, Beijing (CN); Qingying Ge, Beijing (CN); Lili Yang, Beijing (CN); Yong Wang, Shenyang (CN); Yongqing Zhang, Beijing (CN); Zhaohui Wang, Beijing (CN); Lin Cheng, Beijing (CN); Jingdong Hu, Beijing (CN); Deli Gao, Beijing (CN); Haifang Sun, Beijing (CN); Xi Wang, Beijing (CN)

(73) Assignee: China University of Petroleum (Beijing), Beijing (CN)

( * ) Notice: Subject to any disclaimer, the term of this patent is extended or adjusted under 35 U.S.C. 154(b) by 0 days.

(21) Appl. No.: 15/635,997

(22) Filed: Jun. 28, 2017

(30) Foreign Application Priority Data

Aug. 25, 2016 (CN) .......................... 2016 1 0729914
Jan. 18, 2017 (CN) .......................... 2017 1 0038133

(51) Int. Cl.
| | |
|---|---|
| *C09K 8/035* | (2006.01) |
| *C09K 8/12* | (2006.01) |
| *E21B 21/00* | (2006.01) |
| *E21B 21/06* | (2006.01) |
| *E21B 43/00* | (2006.01) |

(52) U.S. Cl.
CPC .............. *C09K 8/035* (2013.01); *C09K 8/12* (2013.01); *E21B 21/00* (2013.01); *E21B 21/003* (2013.01); *E21B 21/062* (2013.01); *E21B 43/006* (2013.01)

(58) Field of Classification Search
None
See application file for complete search history.

(56) References Cited

U.S. PATENT DOCUMENTS

| | | | | |
|---|---|---|---|---|
| 6,818,596 B1* | 11/2004 | Hayes | ...................... | C09K 8/24 507/103 |
| 2005/0187113 A1* | 8/2005 | Hayes | ...................... | C09K 8/24 507/119 |
| 2006/0142165 A1* | 6/2006 | Weaver | ..................... | C09K 8/68 507/227 |
| 2016/0230064 A1* | 8/2016 | Savari | .................... | E21B 21/003 |
| 2016/0289541 A1* | 10/2016 | Zhou | ........................ | C09K 8/52 |
| 2016/0333248 A1* | 11/2016 | Jiang | ........................ | C09K 8/20 |

* cited by examiner

*Primary Examiner* — John J Figueroa
(74) *Attorney, Agent, or Firm* — Calfee, Halter & Grispold LLP

(57) ABSTRACT

The present invention relates to the well drilling field in petroleum industry, in particular to a drilling fluid additive composition suitable for coal-bed gas wells, and a water-based drilling fluid and use of the water-based drilling fluid. The drilling fluid additive composition suitable for coal-bed gas wells, comprising a tackifying and shear improver, a capsulating agent, a filtrate reducer, and an amphiphobic wettability reversal agent, wherein the tackifying and shear improver is a copolymer comprising structural units represented by formula (1), structural units represented by formula (2), and structural units represented by formula (3); the capsulating agent is a comb-like polysaccharide compound; the filtrate reducer is nanocrystalline cellulose, and the amphiphobic wettability reversal agent is a dual-cation fluorocarbon surfactant. The composition provided in the present invention can be used as an additive in a solid-free brine drilling fluid, so that the brine drilling fluid obtains advantages of a high penetration rate and a low residue rate.

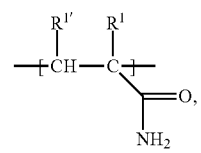

formula (1)

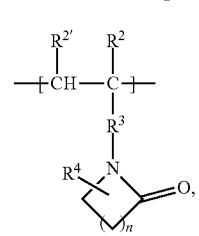

formula (2)

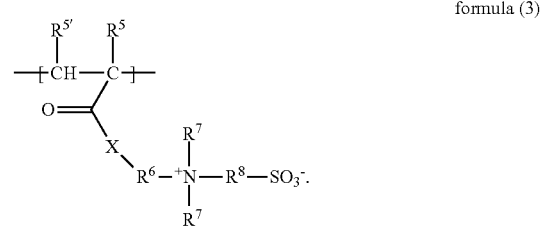

formula (3)

19 Claims, No Drawings

DRILLING FLUID ADDITIVE COMPOSITION SUITABLE FOR COAL-BED GAS WELLS, AND WATER-BASED DRILLING FLUID AND USE THEREOF

CROSS-REFERENCE TO RELATED APPLICATIONS

This application claims priority to Chinese Application No. 201610729914.0 entitled "Drilling Fluid Additive Composition Suitable for Coal-Bed Gas wells and Use Thereof, and Water-Based Drilling Fluid and Application Thereof", and Chinese Application No. 201710038133.1, filed on Jan. 18, 2017, entitled "Dual-cation Fluorocarbon Surfactant and Preparation Method thereof, and Its Use As Amphiphobic Wettability Reversal Agent and Drilling Fluid and Its Use", which are specifically and entirely incorporated by reference.

FIELD OF THE INVENTION

The present invention relates to the well drilling field in petroleum industry, in particular to a drilling fluid additive composition suitable for coal-bed gas wells, and a water-based drilling fluid and use of the water-based drilling fluid.

BACKGROUND OF THE INVENTION

The coal-bed gas reserve in China is very rich, but has not been exploited commercially at a large scale, mainly because that the coal-bed gas reservoirs are highly sensitive and may be easily contaminated by external fluids and solid phases in the drilling process, consequently the coal-bed gas seepage fractures and channels are clogged, the desorption of coal-bed gas is degraded, and the gas output is severely reduced.

At present, foam drilling fluid technique and under-balanced drilling technique have not been popularized widely yet; instead, a solid-free brine drilling fluid technique may be used for coal-bed gas wells drilling, i.e., the solid-free brine drilling fluid is a brine drilling fluid obtained by adding salts (e.g., KCl, NaCl, etc.) for weighting, instead of using bentonite, barite, and other solid particles. However, a solid-free brine drilling fluid that is highly adaptive to coal-bed gas wells is not available yet.

SUMMARY OF THE INVENTION

The object of the present invention is to provide a drilling fluid additive composition that is well suitable for coal-bed gas wells drilling, a water-based drilling fluid, and use of the water-based drilling fluid.

To attain the object described above, the present invention provides a drilling fluid additive composition suitable for coal-bed gas wells, comprising a tackifying and shear improver, a capsulating agent, a filtrate reducer, and an amphiphobic wettability reversal agent, wherein:

the tackifying and shear improver is a copolymer comprising structural units represented by formula (1), structural units represented by formula (2), and structural units represented by formula (3), wherein:

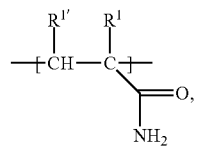

formula (1)

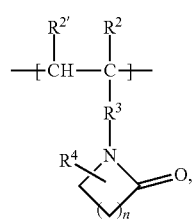

formula (2)

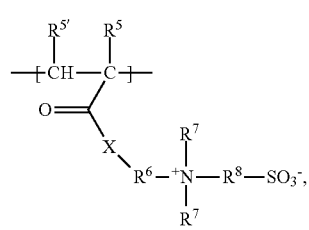

formula (3)

wherein $R^1$, $R^{1'}$, $R^2$, $R^{2'}$, $R^5$, $R^{5'}$, $R^4$ and each $R^7$ are independently selected from H or C1-C8 alkyl; $R^3$, $R^6$ and $R^8$ are independently selected from C0-C8 alkylene; X is selected from —NH— or —O—; n is an integer in a range of 1-4;

the capsulating agent is a comb-like polysaccharide compound, of which the side chains are provided by a compound represented by formula (I) and a compound represented by formula (II), and the main chain is provided by a sulfonated polysaccharide compound, wherein, the sulfonated polysaccharide compound is sulfonated starch, a sulfonated cellulose compound, or sulfonated xanthan gum:

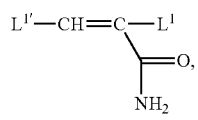

formula (I)

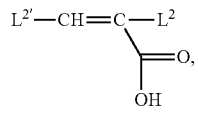

formula (II)

wherein, $L^1$, $L^{1'}$, $L^2$ and $L^{2'}$ are independently selected from H or C1-C6 alkyl;

the filtrate reducer is nanocrystalline cellulose, and the amphiphobic wettability reversal agent is a dual-cation fluorocarbon surfactant of which the cation part is represented by the following formula (a):

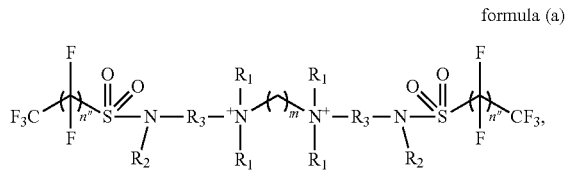

formula (a)

wherein, each $R_1$ is independently selected from C1-C6 alkyl, each $R_2$ is independently selected from H or C1-C6 alkyl, each $R_3$ is independently selected from C1-C10 alkylene, each n" is independently selected from integers within a range of 3-15, and m is selected from integers within a range of 1-10.

The present invention further provides a water-based drilling fluid containing the above-mentioned composition.

The present invention further provides a use of the water-based drilling fluid in coal-bed gas wells drilling.

Under a cooperative effect among the tackifying and shear improver, the capsulating agent, the filtrate reducer and the amphiphobic wettability reversal agent, the composition provided in the present invention can be used as an additive in a solid-free brine drilling fluid, so that the brine drilling fluid obtains advantages of a high penetration rate (the penetration resistance is low since there is no solid phase) and a low residue rate, and a purpose of efficient coal-bed gas wells drilling and reduced damage to the coal-bed gas reservoir can be attained.

Other features and advantages of the present invention will be further detailed in the embodiments hereunder.

DETAILED DESCRIPTION OF THE EMBODIMENTS

Hereunder some embodiments of the present invention will be detailed. It should be appreciated that the embodiments described here are only provided to describe and explain the present invention, but shall not be deemed as constituting any limitation to the present invention.

The ends points and any value in the ranges disclosed in the present invention are not limited to the exact ranges or values. Instead, those ranges or values shall be comprehended as encompassing values that are close to those ranges or values. For numeric ranges, the end points of the ranges, the end points of the ranges and the discrete point values, and the discrete point values may be comb-likened to obtain one or more new numeric ranges, which shall be deemed as having been disclosed specifically in this document.

The present invention provides a drilling fluid additive composition suitable for coal-bed gas wells, comprising a tackifying and shear improver, a capsulating agent, a filtrate reducer, and an amphiphobic wettability reversal agent, wherein:

the tackifying and shear improver is a copolymer comprising structural units represented by formula (1), structural units represented by formula (2), and structural units represented by formula (3), wherein:

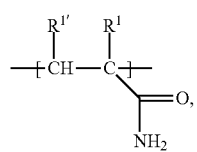

formula (1)

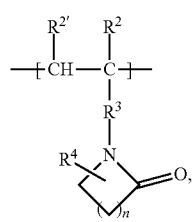

formula (2)

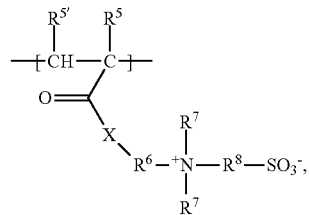

formula (3)

wherein $R^1$, $R^{1'}$, $R^2$, $R^{2'}$, $R^5$, $R^{5'}$, $R^4$ and each $R^7$ are independently selected from H or C1-C8 alkyl; $R^3$, $R^6$ and $R^8$ are independently selected from C0-C8 alkylene; X is selected from —NH— or —O—; n is an integer in a range of 1-4;

the capsulating agent is a comb-like polysaccharide compound, of which the side chains are provided by a compound represented by formula (I) and a compound represented by formula (II), and the main chain is provided by a sulfonated polysaccharide compound, wherein the sulfonated polysaccharide compound is sulfonated starch, a sulfonated cellulose compound, or sulfonated xanthan gum:

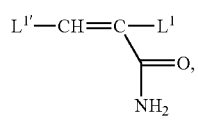

formula (I)

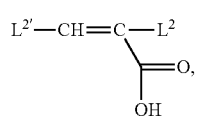

formula (II)

wherein, $L^1$, $L^{1'}$, $L^2$ and $L^{2'}$ are independently selected from H or C1-C6 alkyl;

the filtrate reducer is nanocrystalline cellulose, and the amphiphobic wettability reversal agent is a dual-cation fluorocarbon surfactant of which the cation part is represented by the following formula (a):

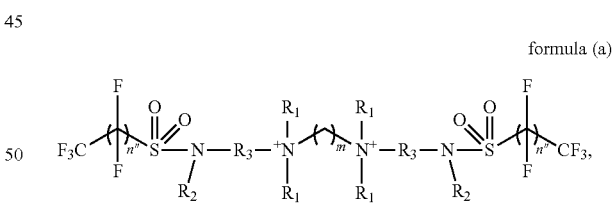

formula (a)

wherein, each $R_1$ is independently selected from C1-C6 alkyl, each $R_2$ is independently selected from H or C1-C6 alkyl, each $R_3$ is independently selected from C1-C10 alkylene, each n" is independently selected from integers within a range of 3-15, and m is selected from integers within a range of 1-10.

According to the present invention, after the above-mentioned composition is added into a drilling fluid, the drilling fluid can be used in coal-bed gas wells drilling without solid phase, mainly because the compositions exert a good synergetic effect in a saline water environment without bentonite; thus, utilizing a cooperative effect among the components of the composition provided in the present invention, an effect of high penetration rate and reduced damage to the reservoir can be attained in coal-bed gas wells drilling. To give a better play to the cooperative effect among the components, preferably, the weight ratio of the tackifying and shear improver to the capsulating agent to the filtrate reducer to the amphiphobic wettability reversal agent is 100:5-50:100-300:5-100, more preferably is 100:6-30:120-200:10-50, even more preferably is 100:7-25:150-180:10-30, e.g., 100:7-25:150-180:10-20.

According to the present invention, the molecular chains of the copolymer as the tackifying and shear improver can fully stretch out in the saline water and intertwine with each other to form a high-strength spatial grid structure, so that the copolymer exhibits favorable tackifying and rheological modifying performance even in a brine drilling fluid system. Even at high temperatures, the tackifying effect provided by the copolymer still can effectively improve the apparent viscosity, yield point and static shear force of the brine drilling fluid system. Thus, after the copolymer is added together with other necessary components of the composition provided in the present invention and added into a brine drilling fluid, the brine drilling fluid can be used in coal-bed gas wells drilling without a solid phase component and attains effects of high penetration rate and low residue rate, so as to realize efficient coal-bed gas wells drilling and reduced damage to the coal-bed gas reservoir.

According to the present invention, wherein, the C1-C8 alkyl may be methyl, ethyl, n-propyl, isopropyl, n-butyl, isobutyl, sec-butyl, tert-butyl, n-pentyl, isopentyl, n-hexyl, n-heptyl, or n-nonyl, etc., for example.

For example, the C0-C8 alkylene may be C0 alkylene or alkylene formed by the above-mentioned C1-C8 alkyl, wherein, the C0 alkylene may be deemed as a linking bond or absent simply, i.e., the groups at the two ends of that group are directly linked.

To give a better play to the effect of the copolymer as a rheological modifier, preferably, in the copolymer as the tackifying and shear improver, $R^1$, $R^{1'}$, $R^2$, $R^{2'}$, $R^5$, $R^{5'}$, $R^4$ and each $R^7$ are independently selected from H or C1-C6 alkyl; $R^3$, $R^6$ and $R^8$ are independently selected from C0-C6 alkylene; n is an integer in a range of 1-3.

More preferably, $R^1$, $R^{1'}$, $R^2$, $R^{2'}$, $R^5$, $R^{5'}$ and $R^4$ are independently selected from H or C1-C4 alkyl; each $R^7$ is independently selected from C1-C6 alkyl; $R^3$ is selected from C0-C4 alkylene; $R^6$ and $R^8$ are independently selected from C1-C6 alkylene.

Further preferably, $R^1$, $R^{1'}$, $R^2$, $R^{2'}$, $R^5$, $R^{5'}$ and $R^4$ are independently selected from H, methyl, ethyl, n-propyl, isopropyl or n-butyl; each $R^7$ is independently selected from methyl, ethyl, n-propyl, isopropyl, or n-butyl; $R^3$ is selected from C0 alkylene, —CH$_2$—, —CH$_2$—CH$_2$—, —CH$_2$—CH$_2$—CH$_2$—, —CH(CH$_3$)—CH$_2$—, —CH$_2$—CH(CH$_3$)— or —CH$_2$—(CH$_2$)$_2$—CH$_2$—; $R^6$ and $R^8$ are independently selected from —CH$_2$—, —CH$_2$—CH$_2$—, —CH$_2$—CH$_2$—CH$_2$—, —CH(CH$_3$)—CH$_2$—, —CH$_2$—CH(CH$_3$)—, —CH$_2$—(CH$_2$)$_2$—CH$_2$—, —CH$_2$—CH(CH$_3$)—CH$_2$—, —C(CH$_3$)$_2$—CH$_2$—, —CH$_2$—C(CH$_3$)$_2$—, —CH$_2$—(CH$_2$)$_3$—CH$_2$— or —CH$_2$—(CH$_2$)$_4$—CH$_2$—.

According to the present invention, the copolymer as the tackifying and shear improver, preferably, the weight-average molecular weight of the copolymer is 1,000,000-6,000,000 g/mol, more preferably is 2,000,000-5,500,000 g/mol, further preferably is 2,500,000-5,000,000 g/mol, more preferably is 3,000,000-4,500,000 g/mol, e.g., 3,000,000-4,000,000 g/mol. If the weight-average molecular weight of the copolymer is within the above-mentioned ranges, especially in the range of 3,000,000-4,500,000 g/mol, the polymer can be used as a rheological modifier in a better way, and can maintain good salinity resistance and temperature resistance properties in a brine drilling fluid. For example, the molecular weight distribution coefficient of the copolymer may be 1.2-4, preferably is 1.5-3.

According to the present invention, in the copolymer as the tackifying and shear improver, though the contents of the structural units represented by formula (1), structural units represented by formula (2) and structural units represented by formula (3) contained in the copolymer may vary within a wide range, for the purpose of optimizing the tackifying, salinity resistance, and temperature resistance properties of the resultant copolymer, preferably, the molar ratio of the structural units represented by formula (1) to the structural units represented by formula (2) to the structural units represented by formula (3) is 10-40:1-10:1, more preferably is 15-30:2-5:1, further preferably is 18-25:3-4:1.

According to the present invention, in the copolymer as the tackifying and shear improver, the copolymer should be understood as a linear copolymer, which may be of random type, block type, or alternating type, but usually should be understood as a linear random copolymer. Though the copolymer may further include other structural units that have no impact on the performance of the copolymer as a rheological modifier, for the sake of convenience, it should be appreciated that the copolymer is composed of structural units represented by formula (1), structural units represented by formula (2), and structural units represented by formula (3), but there is no particular restriction on the terminal group; however, usually the terminal group is H.

According to the present invention, the copolymer as the tackifying and shear improver may be prepared with any conventional method in the art, as long as it can work well with other components in the composition provided in the present invention and exerts a good tackifying and rheological modifying effect in a brine drilling fluid, so as to adapt to coal-bed gas wells drilling. Preferably, the method for preparing the copolymer serving as the tackifying and shear improver comprises: in an aqueous solution, subjecting a compound represented by formula (1'), a compound represented by formula (2'), and a compound represented by formula (3') to have a free radical polymerization reaction, in the presence of a radical initiator and a chain-transfer agent, wherein,

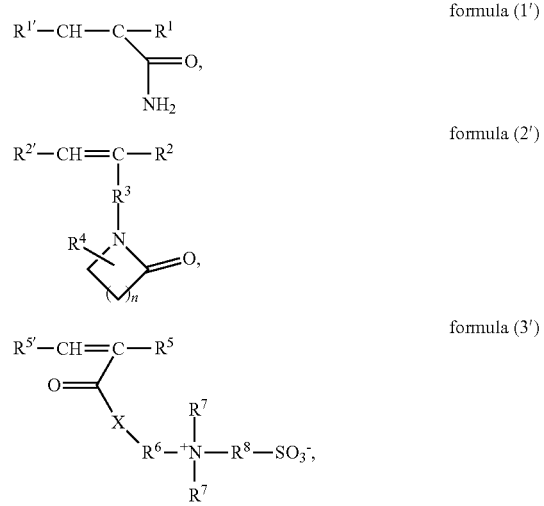

Wherein, the substituents involved in the monomers in the above-mentioned method are those described above, and will not be detailed anymore here. Alternatively, the compound represented by formula (1'), compound represented by formula (2'), and compound represented by formula (3') may be selected properly according to the specific structural units of the copolymer described above.

Wherein, the examples of the compound represented by formula (1') may be one or more of compounds represented by the following formula:
in formula (1'-1): in the formula (1'), $R^1$ and $R^{1'}$ are H (also referred to as acrylamide);
in formula (1'-2): in the formula (1'), $R^1$ is methyl, and $R^{1'}$ is H (also referred to as methacrylamide);
in formula (1'-3): in the formula (1'), $R^1$ is ethyl, and $R^{1'}$ is H (also referred to as ethyl acrylamide);
in formula (1'-4): in the formula (1'), $R^1$ is H, and $R^{1'}$ is methyl (also referred to as 2-butenylamide).

Wherein, the examples of the compound represented by formula (2') may be one or more of compounds represented by the following formula:
in formula (2'-1): in the formula (2'), $R^4$, $R^2$ and $R^{2'}$ are H, $R^3$ is selected from C0 alkylene, and n=2 (also referred to as N-vinyl pyrrolidone);
in formula (2'-2): in the formula (2'), $R^4$, $R^2$ and $R^{2'}$ are H, $R^3$ is selected from C0 alkylene, and n=1;
in formula (2'-3): in the formula (2'), $R^4$, $R^2$ and $R^{2'}$ are H, $R^3$ is selected from C0 alkylene, and n=3;
in formula (2'-4): in the formula (2'), $R^4$, $R^2$ and $R^{2'}$ are H, $R^3$ is selected from —$CH_2$—, and n=2;
in formula (2'-5): in the formula (2'), $R^4$, $R^2$ and $R^{2'}$ are H, $R^3$ is selected from —$CH_2$—, and n=1;
in formula (2'-6): in the formula (2'), $R^4$, $R^2$ and $R^{2'}$ are H, $R^3$ is selected from —$CH_2$—, and n=3.

Wherein, the examples of the compound represented by formula (3') may be one or more of compounds represented by the following formula:
in formula (3'-1): in the formula (3'), $R^5$ is methyl, $R^{5'}$ is H, X is selected from —O—, $R^6$ is selected from —$CH_2$—$CH_2$—, each $R^7$ is methyl, and $R^8$ is selected from —$CH_2$—$CH_2$—$CH_2$— (also referred to as 3-[N,N-dimethyl-[2-(methylacryloyloxy)ethyl]ammonium]propyl-1-sulfonate);
in formula (3'-2): in the formula (3'), $R^5$ is methyl, $R^{5'}$ is H, X is selected from —O—, $R^6$ is selected from —$CH_2$—$CH_2$—, each $R^7$ is methyl, and $R^8$ is selected from —$CH_2$—$CH(CH_3)$—$CH_2$— (also referred to as 3-[N,N-dimethyl-[2-(methylacryloyloxy)ethyl]ammonium]isobutyl-1-sulfonate);
in formula (3'-3): in the formula (3'), $R^5$ and $R^{5'}$ are H, X is selected from —NH—, $R^6$ is selected from —$CH_2$—$CH_2$—$CH_2$—, each $R^7$ is methyl, and $R^8$ is selected from —$CH_2$—$CH_2$—$CH_2$— (also referred to as [3-(methylacryloylamido)propyl]dimethyl(3-sulfopropyl)ammonium hydroxide);
in formula (3'-4): in the formula (3'), $R^5$ and $R^{5'}$ are H, X is selected from —NH—, $R^6$ is selected from —$CH_2$—$CH_2$—$CH_2$—, each $R^7$ is methyl, and $R^8$ is selected from —$CH_2$—$(CH_2)_2$—$CH_2$— (also referred to as [3-(methylacryloylamido)propyl]dimethyl(3-sulfobutyl)ammonium hydroxide);
in formula (3'-5): in the formula (3'), $R^5$ is methyl, $R^{5'}$ is H, X is selected from —O—, $R^6$ is selected from —$CH_2$—$CH_2$—, each $R^7$ is methyl, and $R^8$ is selected from —$CH(CH_3)_2$—$CH_2$— (also referred to as 3-[N,N-dimethyl-[2-(methylacryloyloxy)ethyl]ammonium]tert-butyl-1-sulfonate).

According to the present invention, in the method for preparing the copolymer as the tackifying and shear improver, the amounts of the monomers may be selected according to the proportions and molecular weights of the required structural units in the copolymer; preferably, the molar ratio of the compound represented by formula (1') to the compound represented by formula (2') to the compound represented by formula (3') is 10-40:1-10:1, more preferably is 15-30:2-5:1, further preferably is 18-25:3-4:1, e.g., 20-25:3-4:1. To adapt to the free radical polymerization reaction and reasonably control the molecular weight of the resultant copolymer, preferably, based on 1 mol of total amount of the compound represented by formula (1'), the compound represented by formula (2') and the compound represented by formula (3'), the amount of the aqueous solution is 400-1000 mL, preferably is 400-600 mL Wherein, the aqueous solution may be water itself or a mixture of water and some solutes that don't have impact on the reaction in the present invention (e.g., one or more of sodium chloride, potassium chloride, sodium bromide, and potassium bromide, etc.); of course, preferably the aqueous solution is water.

According to the present invention, in the method for preparing the copolymer as the tackifying and shear improver, the free radical polymerization reaction may be initiated by a variety of conventional radical initiators in the art; however, in view of the reactivity among the monomers above, preferably, the radical initiator is one or more of 4,4'-azobis(4-cyanovaleric acid), 2,2'-Azobis(isobutyramidine) dihydrochloride, 2,2'-azobis[2-(2-imidazolin-2-yl)propane] dihydrochloride, and 2,2'-azobis[2-(2-imidazolin-2-yl)butane] dihydrochloride. The amount of the radical initiator may vary within a wide range; preferably, based on 1 mol of total amount of the compound represented by formula (1'), the compound represented by formula (2') and the compound represented by formula (3'), the amount of the radical initiator is 0.1-0.2 mmol, more preferably is 0.11-0.14 mmol.

According to the present invention, in the method for preparing the copolymer as the tackifying and shear improver, the chain-transfer agent may be any conventional chain-transfer agent in the art; however, to obtain a copolymer with more suitable molecular weight, preferably, the chain-transfer agent is selected from one or more of sodium formate, sodium acetate, ammonium hydroxide, and urea, more preferably is sodium formate and/or sodium acetate. The amount of the chain-transfer agent may vary within a wide range; preferably, based on 1 mol of total amount of the compound represented by formula (1'), the compound represented by formula (2') and the compound represented by formula (3'), the amount of the chain-transfer agent is 0.1-0.2 mmol, more preferably is 0.13-0.15 mmol.

According to the present invention, in the method for preparing the copolymer as the tackifying and shear improver, preferably, the conditions of the free radical polymerization reaction include: a temperature of 40-80° C. and a time of 6-12 h. More preferably, the conditions of the free radical polymerization reaction include: a temperature of 50-70° C. and a time of 7-10 h.

According to the present invention, in the method for preparing the copolymer as the tackifying and shear improver, to remove some possible metal components in the system, preferably, the free radical polymerization reaction is executed in the presence of a chelator. In that case, under the action of the chelator, some possible metal ions can be inhibited successfully by virtue of chelation. For example, the chelator may be selected from one or more of ethylenediamine tetraacetic acid and its salts (e.g., tetrasodium ethylene diamine tetracetate), nitrilotriacetic acid and its salts (e.g., sodium nitrilotriacetate), hexametaphosphoric acid and its salt (e.g., sodium hexametaphosphate), and diethylene triamine pentamethylene phosphonic acid. Preferably, based on 1 mol of total amount of the compound represented by formula (1'), the compound represented by formula (2') and the compound represented by formula (3'), the amount of the chelator is 0.01-0.05 mmol, more preferably is 0.01-0.02 mmol.

According to the present invention, in the method for preparing the copolymer as the tackifying and shear improver, to maintain the activity of the initiator or the like, the method may further comprise: executing the free radical polymerization reaction in an inert atmosphere; for example, one or more of nitrogen, helium, neon, and argon, etc. may be charged into the system to displace the original atmosphere (e.g., that process may be executed for 5-300 min, mainly for the purpose of removing oxygen).

According to the present invention, in the method for preparing the copolymer as the tackifying and shear improver, to better control the free radical polymerization reaction, preferably, the method comprises: mixing the compound represented by formula (1'), the compound represented by formula (2'), the compound represented by formula (3') and the aqueous solution first (for example, the mixing conditions may include: mixing at 10-40° C. for 10-40 min when stirring at 100-300 rpm), and then introducing the radical initiator, the chain-transfer agent, and an optional chelator and mixing, and executing the free radical polymerization reaction in an inert atmosphere (the inert atmosphere is formed as described above).

According to the present invention, in the method for preparing the copolymer as the tackifying and shear improver, to extract the copolymer from the reaction product, the method may further comprise: drying the product of the free radical polymerization reaction at 70-100° C. for 2-5 h.

According to the present invention, in the method for preparing the copolymer as the tackifying and shear improver, it should be appreciated that the copolymer prepared with the method usually refers to the direct product obtained with the method without purification (or only treated by drying as described above). Though such a product may be a mixture of a variety of polymers, such cases are also included in the scope of the present invention.

According to the present invention, the comb-like polysaccharide compound may be regarded as a polymer obtained by grafting side chains provided by the compound represented by formula (I) and the compound represented by formula (II) on the main chain of a sulfonated polysaccharide compound, wherein, the side chains may be copolymeric chains of the compound represented by formula (I) and the compound represented by formula (II), or may be homopolymeric chains provided by the compound represented by formula (I) and homopolymeric chains provided by the compound represented by formula (II) respectively. When the comb-like polysaccharide compound is used as a capsulating agent in a drilling fluid, it can effectively aggregate highly dispersed rock cuttings into large-size particles by means of a multi-point absorption effect of the polar groups on the molecular chains on the rock cuttings, so that the large-size particles are removed in the solid control process; thus, the comb-like polysaccharide compound exerts an excellent encapsulating effect; moreover, the comb-like polysaccharide compound can achieve good temperature-resistant and salt-resistant performance while exerting an excellent encapsulating effect. In addition, surprisingly, compared with linear capsulating agent polymers, the comb-like polysaccharide compound in the present invention not only can achieve higher coating performance, high temperature-resistant performance and higher salt-resistant performance, but also can achieve better water solubility, and thereby is more suitable for use in a water-based drilling fluid. Thus, after the capsulating agent is added together with other necessary components of the composition provided in the present invention and added in a brine drilling fluid, the brine drilling fluid can be used in coal-bed gas wells drilling without a solid phase component and attains effects of high penetration rate and low residue rate, so as to realize efficient coal-bed gas wells drilling and reduced damage to the coal-bed gas reservoir.

According to the present invention, wherein, the C1-C6 alkyl may be methyl, ethyl, n-propyl, isopropyl, n-butyl, isobutyl, sec-butyl, tert-butyl, n-pentyl, isopentyl, n-hexyl, etc., for example.

To give a better play to the effect of the comb-like polysaccharide compound as a capsulating agent, preferably, $R^1$, $R^{1'}$, $R^2$ and $R^{2'}$ are independently selected from H, methyl, ethyl, n-propyl, isopropyl, or n-butyl.

Wherein, the examples of the compound represented by formula (I) may be one or more of compounds represented by the following formula:
in formula (I-1): in the formula (I), $R^1$ and $R^{1'}$ are H (also referred to as acrylamide);
in formula (I-2): in the formula (I), $R^1$ is methyl, and $R^{1'}$ is H (also referred to as methacrylamide);
in formula (I-3): in the formula (I), $R^1$ is ethyl, and $R^{1'}$ is H (also referred to as ethyl acrylamide);
in formula (I-4): in the formula (I), $R^1$ is H, and $R^{1'}$ is methyl (also referred to as 2-butenylamide).

Wherein, the examples of the compound represented by formula (II) may be one or more of compounds represented by the following formula:
in formula (II-1): in the formula (II), $R^2$ and $R^{2'}$ are H (also referred to as acrylic acid);
in formula (II-2): in the formula (II), $R^2$ is methyl, and $R^{2'}$ is H (also referred to as methacrylic acid).

According to the present invention, in the comb-like polysaccharide compound serving as the capsulating agent, the sulfonated polysaccharide compound is sulfonated starch, a sulfonated cellulose compound, or sulfonated xanthan gum. Those sulfonated polysaccharide compounds may be commercial products, or may be prepared through the process described below in the present invention. The sulfonated polysaccharide compound may be regarded as a polysaccharide compound with some sulfonic groups or other sulfur-bearing groups formed on it. That is common general knowledge in the art, and will not be further detailed here.

Wherein, the sulfonated cellulose compound preferably is sulfonated carboxymethyl cellulose, sulfonated hydroxymethyl cellulose, sulfonated carboxyethyl cellulose, sulfonated hydroxyethyl cellulose, sulfonated hydroxypropyl cellulose, or sulfonated hydroxypropyl methyl cellulose.

According to the present invention, though the content of the sulfur-bearing groups (e.g., sulfonic groups, sulfate groups, thiol groups, etc.) on the sulfonated polysaccharide compound could be vary within a wide range in the present invention, and in order to obtain a comb-like polysaccharide compound that is more suitable to use as the capsulating agent, preferably, in the sulfonated polysaccharide compound, the content of the sulfur-bearing groups is 20-35 wt. %, more preferably is 25-30 wt. %.

According to the present invention, in the comb-like polysaccharide compound as the capsulating agent, the molecular weight of the comb-like polysaccharide compound may vary within a wide range. In order to obtain a comb-like polysaccharide compound that is more suitable to use as the capsulating agent, preferably, the weight-average molecular weight of the comb-like polysaccharide compound is 9,000,000-15,000,000 g/mol, more preferably is 9,500,000-14,500,000 g/mol, even more preferably is 10,000,000-13,500,000 g/mol, further preferably is 12,000,000-13,500,000 g/mol.

According to the present invention, in the comb-like polysaccharide compound as the capsulating agent, preferably, the content of the structural units provided by the compound represented by formula (I) and the compound represented by formula (II) in the comb-like polysaccharide compound is 80-95 wt. %, more preferably is 85-92 wt. %, even more preferably is 88-92 wt. %. If the structural units of the compound represented by formula (I) and the compound represented by formula (II) that provide the side chains and the structural units of the sulfonated polysaccharide compound that provides the main chain meet the above-mentioned weight percentage, a synergetic effect among the groups in the comb-like polysaccharide compound can be exerted more fully, and higher water solubility can be achieved; thus, working with other required components in the composition provided in the present invention, the coat can achieve excellent coating performance, temperature-resistant performance, and salt-resistant performance.

According to the present invention, in the comb-like polysaccharide compound as the capsulating agent, though the molar ratio of the structural units provided by the compound represented by formula (I) to the structural units provided by the compound represented by formula (II) may vary within a wide range, preferably, the molar ratio of the structural units provided by the compound represented by formula (I) to the structural units provided by the compound represented by formula (II) is 1:0.2-1, more preferably is 1:0.2-0.5, even more preferably is 1:0.24-0.4 (e.g., 1:0.25-0.33), further preferably is 1:0.27-0.33. If the molar ratio of the structural units provided by the compound represented by formula (I) to the structural units provided by the compound represented by formula (II) is within the above-mentioned range, the obtained side chains can couple with the main chain to exert better capsulating agent performance. As described above, the side chains may be homopolymeric chains provided by the compound represented by formula (I) and homopolymeric chains provided by the compound represented by formula (II); however, more preferably, the side chains are copolymeric chains formed by the compound represented by formula (I) and the compound represented by formula (II), particularly are random linear copolymeric chains. Several side chains are grafted on the sulfonated polysaccharide compound and a comb-like structure is formed, i.e., the comb-like polysaccharide compound described in the present invention is formed.

Though there is no particular restriction on the source of the comb-like polysaccharide compound as the capsulating agent in the present invention and the comb-like polysaccharide compound may be prepared with a conventional method in the art, in order to obtain the comb-like polysaccharide compound conveniently, preferably, the method for preparing the comb-like polysaccharide compound that serves as the capsulating agent comprises:

(1) in an aqueous solution, subjecting a polysaccharide compound to have a sulfonation reaction with a sulfonating agent, to obtain a sulfonated polysaccharide compound;

(2) in the aqueous solution, subjecting the sulfonated polysaccharide compound, a compound represented by formula (I), and a compound represented by formula (II) to have a graft copolymerization reaction, in the presence of a graft copolymerization catalyst;

wherein, the polysaccharide compound is one or more of starch, a cellulose compound, and xanthan gum;

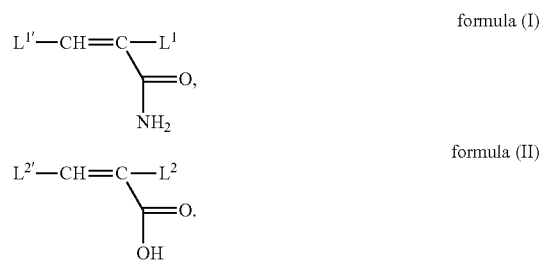

wherein, the compound represented by formula (I), the compound represented by formula (II), and their groups have been described above, and will not be further detailed here.

According to the present invention, in the method for preparing the comb-like polysaccharide compound as the capsulating agent, the sulfonated polysaccharide compound described above is provided through the sulfonation reaction in the step (1); therefore, the polysaccharide compound may be selected according to the required sulfonated polysaccharide compound, i.e., the polysaccharide compound may be one or more of starch, a cellulose compound, and xanthan gum.

According to the present invention, in the method for preparing the comb-like polysaccharide compound as the capsulating agent, the number-average molecular weight of the starch is usually 20,000-2,000,000, and the starch may be any conventional natural starch in the art, such as one or more of potato starch, mung bean starch, sweet potato starch, and wheat starch, etc., wherein, the starch optionally contain its products decomposed in acids, such as one or more of dextrin, maltose, and glucose with lower molecular weight.

Wherein, the cellulose compound is one or more of carboxymethyl cellulose, hydroxymethyl cellulose, carboxyethyl cellulose, hydroxyethyl cellulose, hydroxypropyl cellulose, and hydroxypropyl methyl cellulose. It should be appreciated that the polysaccharide compound usually consists of linear macromolecules; it can be deemed that the following resultant sulfonated polysaccharide compounds also have linear macromolecular structures.

According to the present invention, in the method for preparing the comb-like polysaccharide compound as a capsulating agent, the molecular weight of the polysaccharide compound may be selected according to the required sulfonated polysaccharide compound; for example, in order to prepare a comb-like polysaccharide compound with weight-average molecular weight equal to 9,000,000-15,000,000 g/mol (preferably is 9,500,000-14,500,000 g/mol, more preferably is 10,000,000-13,500,000 g/mol, further preferably is 12,000,000-13,500,000 g/mol), preferably, the weight-average molecular weight of the polysaccharide compound is 100,000-2,000,000 g/mol, more preferably is 150,000-1,000,000 g/mol, e.g., 700,000-1,000,000 g/mol.

According to the present invention, in the method for preparing the comb-like polysaccharide compound as the capsulating agent, the aqueous solution may be water itself, or may be a mixture of water and some solvents that have no impact on the reactions in the present invention (e.g., one or more of methanol, ethanol, ethylene glycol, propanol, and isopropanol, etc.); of course, preferably the aqueous solution is water. To prepare a sulfonated polysaccharide compound that is more suitable to use in the present invention, preferably, in the step (1), based on 100 pbw (parts by weight, "pbw" in the present invention all represent "parts by weight" or "part by weight") polysaccharide compound, the amount of the aqueous solution is 1,000-5,000 pbw, more preferably is 2,000-4,000 pbw.

According to the present invention, in the method for preparing the comb-like polysaccharide compound as the capsulating agent, there is no particular restriction on the sulfonating agent, as long as the sulfonated polysaccharide compound described in the present invention can be obtained with the sulfonating agent; in other words, the sulfonating agent may be an conventional sulfonating agent in the art; preferably, the sulfonating agent is one or more of chlorosulfonic acid, $SO_3$, 1,3-propane sultone, and concentrated sulfuric acid (e.g., the concentration is 90 wt. % or higher; particularly 98 wt. % concentrated sulfuric acid). The amount of the sulfonating agent may vary within a wide range; however, to obtain a sulfonated polysaccharide compound in which the content of the sulfur-bearing groups is 20-35 wt. % (preferably is 25-30 wt. %), preferably, based on 100 pbw of the polysaccharide compound, the amount of the sulfonating agent is 20-40 pbw, more preferably is 25-35 pbw, e.g., 28-30 pbw.

According to the present invention, in the method for preparing the comb-like polysaccharide compound as the capsulating agent, preferably, the conditions of the sulfonation reaction include: a temperature of 50-70° C. (preferably 55-65° C.); a time of 8-20 h (preferably 10-12 h).

According to the present invention, in the method for preparing the comb-like polysaccharide compound as the capsulating agent, in order to promote the dissolvability of the polysaccharide compound in the aqueous solution, the sulfonation reaction is executed in the presence of a solubilizer, which may be one or more of formic acid, acetic acid, oxalic acid, and propandioic acid, wherein, preferably, based on 100 pbw of the polysaccharide compound, the amount of the solubilizer is 8-20 pbw, preferably is 10-15 pbw.

According to the present invention, in the method for preparing the comb-like polysaccharide compound as the capsulating agent, in the step (1), the polysaccharide compound may be mixed with the aqueous solution first, and then a sulfonating agent and an optional solubilizer may be introduced into the mixture and mixed; after that, the sulfonation reaction is executed.

According to the present invention, in the method for preparing the comb-like polysaccharide compound as the capsulating agent, though the product of the sulfonation reaction obtained in the step (1) may be used directly in the step (2) without any further treatment, in order to further promote the graft copolymerization reaction, the step (1) further comprises treating the product of the sulfonation reaction by solid-liquid separation (i.e., by means of suction filtration) and drying the obtained solid phase, so as to obtain the sulfonated polysaccharide compound.

According to the present invention, in the method for preparing the comb-like polysaccharide compound as the capsulating agent, polymer side chains formed by the compound represented by formula (I) and the compound represented by formula (II) can be grafted on the sulfonated polysaccharide compound by subjecting the sulfonated polysaccharide compound, the compound represented by formula (I), and the compound represented by formula (II) to have a graft copolymerization reaction in the step (2). It is believed that the sulfonated polysaccharide compound doesn't have self-polymerization reaction here; instead, on the basis of the sulfonated polysaccharide compound obtained in the step (1), the polymer side chains formed by the compound represented by formula (I) and the compound represented by formula (II) are grafted on the main chain of the sulfonated polysaccharide compound through the graft copolymerization reaction in the step (2). Though the amounts of the compound represented by formula (I) and the compound represented by formula (II) may be selected appropriately according to the situation of required side chains on the comb-like polysaccharide compound, preferably, based on 100 pbw of the sulfonated polysaccharide compound, the total amount of the compound represented by formula (I) and the compound represented by formula (II) is 500-1,500 pbw, more preferably is 800-1,000 pbw, even more preferably is 850-950 pbw. To obtain side chains that couple with the main chain better, preferably, the molar ratio of the compound represented by formula (I) to the compound represented by formula (II) is 1:0.2-1, more preferably is 1:0.2-0.5, even more preferably is 1:0.24-0.4 (e.g., 1:0.25-0.33), further preferably is 1:0.27-0.33.

According to the present invention, in the method for preparing the comb-like polysaccharide compound as the capsulating agent, the aqueous solution in the step (2) is selected as described above; however, in order to prepare a comb-like polysaccharide compound suitable for use in the present invention, preferably, in the step (2), based on 100 pbw of the sulfonated polysaccharide compound, the amount of the aqueous solution is 5,000-10,000 pbw, more preferably is 6,000-9,000 pbw, even more preferably is 6,500-8,000 pbw.

According to the present invention, in the method for preparing the comb-like polysaccharide compound as the capsulating agent, the graft copolymerization catalyst may be any conventional catalyst for graft copolymerization in the art; however, in order to be more suitable for the graft copolymerization reaction among the sulfonated polysaccharide compound, the compound represented by formula (I), and the compound represented by formula (II) in the present invention, preferably, the graft copolymerization catalyst is one or more of a high-valence metal compound and persulfate, wherein, for example, the high-valence metal compound may be one or more of a compound of quadrivalent cerium, a compound of bivalent cobalt, a compound of quinquevalent vanadium, and a compound of trivalent, preferably is one or more of ammonium ceric nitrate, ferric chloride, cobalt(II) meso-tetraphenylporphine, and vanadyl acetylacetonate. Preferably, the persulfate is one or more of ammonium persulfate, sodium persulfate, and potassium persulfate. The amount of the graft copolymerization catalyst may be adjusted according to the required comb-like polysaccharide compound; preferably, based on 100 pbw of the sulfonated polysaccharide compound, the amount of the graft copolymerization catalyst is 0.1-2 pbw, more preferably is 0.2-1 pbw, even more preferably is 0.2-0.5 pbw.

According to the present invention, in the method for preparing the comb-like polysaccharide compound as the capsulating agent, preferably, in the step (2), the conditions of the graft copolymerization reaction include: a temperature of 10-40° C. (preferably 20-35° C., e.g., 25-35° C.); a time of 10-30 h (preferably 16-25 h, e.g., 20-24 h).

According to the present invention, in the method for preparing the comb-like polysaccharide compound as the capsulating agent, in order to maintain the activity of the catalyst or the like, the method may further comprise: executing the graft copolymerization reaction in an inert atmosphere; for example, gas selected from one or more of nitrogen, helium, neon, and argon, etc. may be charged into the system to displace the original atmosphere (e.g., that process may be executed for 5-300 min., mainly for the purpose of removing oxygen).

According to the present invention, in the method for preparing the comb-like polysaccharide compound as the capsulating agent, in order to make the reaction completed more fully, in the step (2), the sulfonated polysaccharide compound and the aqueous solution may be mixed first, and then the compound represented by formula (I) and the compound represented by formula (II) may be introduced and mixed; next, after one or more of nitrogen, helium, neon, and argon, etc. is charged to displace the original atmosphere, the graft copolymerization catalyst may be introduced to have the graft copolymerization reaction.

According to the present invention, the method for preparing the comb-like polysaccharide compound as the capsulating agent may further comprise drying the product of the graft copolymerization reaction so as to obtain the comb-like polysaccharide compound. It should be appreciated that the comb-like polysaccharide compound prepared with the above method usually refers to a direct product of the reaction after drying without purification. Though such a product may be a mixture of a variety of comb-like polysaccharide compounds, such a case is also included in the scope of the present invention.

According to the present invention, in order to obtain better filtrate loss reduction performance, the average particle diameter of the nanocrystalline cellulose as the filtrate reducer preferably is 100-600 nm, more preferably is 150-320 nm.

Preferably, the nanocrystalline cellulose is in a rod form.

In the present invention, the micromorphology and average particle size of the nanocrystalline cellulose are measured with a Transmission Electron Microscope (TEM) Model JEM-2100 from JEOL (a Japanese company). The sample preparation method: dropping the aqueous dispersion of nanocrystalline cellulose diluted to 0.1 wt. % concentration in droplets onto a copper micro grid coated with a carbon film, and drying the aqueous dispersion on the micro grid with an IR lamp.

According to the present invention, the nanocrystalline cellulose may be obtained commercially, or may be prepared with a method well known to those skilled in the art. For example, the nanocrystalline cellulose may be prepared with the following method:
(1) mixing microcrystalline cellulose with acid solution;
(2) subjecting the mixture obtained in step (1) to contact with water, and then carrying out solid-liquid separation for the obtained product.

In the method for preparing the nanocrystalline cellulose, the purpose of mixing the microcrystalline cellulose with acid solution in the step (1) is to make the acid solution infiltrate into the amorphous regions of the microcrystalline cellulose, to accelerate the hydrolysis of the microcrystalline cellulose. In the present invention, the conditions of the mixing step include: mixing temperature of 30-70° C., preferably 35-60° C.; mixing time of 1-15 h, preferably 3-10 h. Preferably, the mixing is accomplished with a high speed mixer, the rotation speed of which can be 100-300 rpm.

In the method for preparing the nanocrystalline cellulose, in the step (1), the weight ratio of the microcrystalline cellulose to the acid solution may vary within a wide range, as long as the microcrystalline cellulose can be hydrolyzed. Generally, the weight ratio of the microcrystalline cellulose to the acid solution may be 1:20-40, preferably is 1:20-30. The concentration of the acid solution may be 30-80 wt. %, preferably is 50-70 wt. %.

In the method for preparing the nanocrystalline cellulose, the acid in the acid solution may be any conventional inorganic acid or organic acid that can infiltrate into the amorphous regions of the microcrystalline cellulose. In the present invention, the inorganic acid may be any conventional inorganic acid, such as one or more of hydrochloric acid, sulfuric acid, phosphoric acid, and nitric acid; the organic acid may be any conventional organic acid, such as C1-C5 mono or binary organic carboxylic acid; specifically, the organic acid may be one or more of formic acid, acetic acid, tartaric acid, and citric acid.

In the method for preparing the nanocrystalline cellulose in the present invention, the microcrystalline cellulose may be obtained commercially. To obtain nanocrystalline cellulose particles in a specific particle size, preferably, the average particle diameter of the microcrystalline cellulose particles is 20-80 μm, more preferably is 20-50 μm.

In the method for preparing the nanocrystalline cellulose, in the step (2), the purpose of subjecting the mixture obtained in the step (1) to contact with water is to terminate the hydrolytic reaction of the microcrystalline cellulose with water. Based on 100 pbw of the microcrystalline cellulose, the amount of water may be 2,000-7,500 pbw, preferably is 4,000-7,500 pbw.

In the method for preparing the nanocrystalline cellulose, the method for solid-liquid separation in the step (2) may be any conventional method for solid-liquid separation in the art, such as filtering separation and/or centrifugal separation. Preferably, the solid-liquid separation is centrifugal separation. In the present invention, there is no particular restriction on the conditions of the centrifugation, as long as the resultant suspension liquid can be separated to obtain a crystal and a liquid phase. The conditions of the centrifugal separation may include: rotation speed of centrifugation: 3,000-11,000 rpm, preferably 6,000-11,000 rpm; centrifugation time: 5-30 min., preferably 10-20 min.

In the method for preparing the nanocrystalline cellulose, in order to avoid the impact of residual acid on the subsequent filtrate loss reduction effect, the method preferably comprises: washing the solid obtained by centrifugal separation with water till the pH of the liquid obtained by centrifugation is 6-7, and then drying the solid. The conditions of the drying include: a drying temperature of 100-110° C. and a drying time of 8-12 h.

According to the present invention, the dual-cation fluorocarbon surfactant can serve as an amphiphobic wettability reversal agent when it is used in a drilling fluid; thus, when the drilling fluid is used for oil and gas drilling, the molecules of the dual-cation fluorocarbon surfactant can be absorbed to the rock surface easily owing to the fact that the molecules have low surface tension, and thereby the rock obtains an amphiphobic property; as a result, permeation of water and oil into the rock can be avoided effectively and thereby a capillary phenomenon can be prevented, and an effect of stabilizing the well wall and protecting the reservoir is attained.

In the present invention, the C1-C6 alkyl may be methyl, ethyl, n-propyl, isopropyl, n-butyl, isobutyl, sec-butyl, tert-butyl, n-pentyl, isopentyl, n-hexyl, etc., for example.

The C1-C10 alkylene may be the alkylene formed by C1-C6 alkyl described above, or n-heptyl, n-nonyl, or n-decyl, etc.

According to the present invention, preferably, in formula (a), each $R_1$ is selected from C1-C4 alkyl respectively and independently, each $R_2$ is independently selected from H and C1-C4 alkyl, each $R_3$ is independently selected from C2-C8 alkylene, each n" is independently selected from integers within a range of 4-10, and m is selected from integers within a range of 2-8.

More preferably, in formula (a), each $R_1$ is independently selected from C1-C4 alkyl, each $R_2$ is independently selected from H and C1-C4 alkyl, each $R_3$ is independently selected from C2-C6 alkylene, each n" is independently selected from integers within a range of 4-8, and m is selected from integers within a range of 3-6.

Further more preferably, in formula (a), each $R_1$ is independently selected from methyl, ethyl, n-propyl, isopropyl, and n-butyl, each $R_2$ is independently selected from H, methyl, ethyl, n-propyl, isopropyl, and n-butyl, each $R_3$ is independently selected from $-CH_2-CH_2-$, $-CH_2-CH_2-CH_2-$, $-CH(CH_3)-CH_2-$, $-CH_2-CH(CH_3)-$, $-CH_2-(CH_2)_2-CH_2-$, $-CH_2-(CH_2)_3-CH_2-$, and $-CH_2-(CH_2)_4-CH_2-$, each n" is independently selected from 4, 5, 6, 7 and 8, and m is selected from 3, 4, 5 or 6.

In a preferred embodiment of the present invention, the cation part shown in formula (a) is one of the following cations:

Formula (a-1): in formula (a), all the $R_1$ is methyl, both $R_2$ is H, both $R_3$ is $-CH_2-CH_2-CH_2-$, both n" is 4, and m is 4;
Formula (a-2): in formula (a), all the $R_1$ is methyl, both $R_2$ is H, both $R_3$ is $-CH_2-CH_2-CH_2-$, both n" is 6, and m is 4;
Formula (a-3): in formula (a), all the $R_1$ is methyl, both $R_2$ is H, both $R_3$ is $-CH_2-CH_2-CH_2-$, both n" is 8, and m is 4;
Formula (a-4): in formula (a), all the $R_1$ is methyl, both $R_2$ is H, both $R_3$ is $-CH_2-CH_2-CH_2-$, both n" is 4, and m is 6.

There is no particular restriction on the anion part of the dual-cation fluorocarbon surfactant in the present invention; namely, the anion may be any conventional anion in the art; however, preferably, the anion part of the dual-cation fluorocarbon surfactant is selected from one or more of $Cl^-$, $Br^-$, and $I^-$, more preferably is $Cl^-$ or $Br^-$.

The present invention further provides a method for preparing the dual-cation fluorocarbon surfactant, comprising: subjecting the compound represented by formula (b-2) and the compound represented by formula (b-3) to have a substitution reaction in an alcohol solvent, wherein

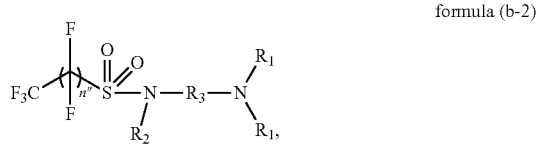

formula (b-2)

formula (b-3)

X is selected from halogen.

According to the present invention, the compound represented by formula the (b-2) and the compound represented by formula the (b-3) have a substitution reaction, so that two molecules of the compound represented by formula the (b-2) are linked to the two ends of a molecule of the compound represented by formula (b-3), forming a dual-cation fluorocarbon structure with two quaternary ammonium cations represented by formula (a).

Wherein, the compound represented by formula (b-2) and the compound represented by formula (b-3) may be selected according to the dual-cation fluorocarbon surfactant. They will not be detailed any more here.

In a preferred embodiment of the present invention, the compound represented by formula (b-2) is selected from one or more of compounds represented by the following formulae:

In formula (b-2-1): in formula (b-2), both $R_1$ is methyl, $R_2$ is H, $R_3$ is $-CH_2-CH_2-CH_2-$, and n" is 4;
In formula (b-2-2): in formula (b-2), both $R_1$ is methyl, $R_2$ is H, $R_3$ is $-CH_2-CH_2-CH_2-$, and n" is 6;
In formula (b-2-3): in formula (b-2), both $R_1$ is methyl, $R_2$ is H, $R_3$ is $-CH_2-CH_2-CH_2-$, and n" is 8.

The compound represented by formula (b-3) is selected from one or more of compound represented by the following formulae:

In formula (b-3-1): in formula (b-3), X is Br, and m is 4;
In formula (b-3-2): in formula (b-3), X is Br, and m is 6.

According to the present invention, the compound represented by formula (b-2) may be a commercially available product or prepared with a conventional method in the art. For example, the method for preparing the compound represented by formula (b-2) may comprise: subjecting a compound represented by formula (b-4) and a perfluoroalkyl sulfuryl fluoride compound represented by formula (b-5) to have a contact reaction in the presence of a basic catalyst in an organic solvent, wherein

formula (b-4)

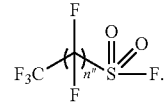

formula (b-5)

The groups involved in the formulae are those as defined above, and will not be further detailed here.

In a preferred embodiment of the present invention, the compound represented by formula (b-4) is selected from one or more of compounds represented by the following formulae:

In formula (b-4-1): in formula (b-4), both $R_1$ is methyl, $R_2$ is H, and $R_3$ is $-CH_2-CH_2-CH_2-$ (also referred to as N,N-dimethyl-1,3-propylene diamine).

The perfluoroalkyl sulfuryl fluoride compound represented by formula (b-5) is selected from one or more of compounds represented by the following formulae:

In formula (b-5-1): in formula (b-5), n" is 4 (also referred to as perfluorobutyl sulfuryl fluoride);
In formula (b-5-2): in formula (b-5), n" is 6 (also referred to as perfluorohexyl sulfuryl fluoride);
In formula (b-5-3): in formula (b-5), n" is 8 (also referred to as perfluorooctyl sulfuryl fluoride).

Wherein, the molar ratio of the compound represented by formula (b-4) to the perfluoroalkyl sulfuryl fluoride compound represented by formula (b-5) may be 1:0.8-3, for example. The basic catalyst preferably is one or more of triethylamine and/or triethanolamine. The molar ratio of the basic catalyst to the compound represented by formula (b-4) may be 1-3:1, for example. The organic solvent may be one or more of dichloromethane, dichloroethane, THF and DMF. With respect to 0.1 mol compound represented by formula (b-4), the amount of the organic solvent preferably is 150-300 mL. Preferably, the conditions of the contact reaction include: reacting at 0-10° C. for 30-100 min firstly, and then reacting at 15-40° C. for 3-6 h. To make the reaction proceed more fully, preferably, the compound represented by formula (b-4), the basic catalyst, and the organic solvent are mixed first, and then the perfluoroalkyl sulfuryl fluoride compound represented by formula (b-5) is introduced. Especially, the perfluoroalkyl sulfuryl fluoride compound represented by formula (b-5) is introduced by dropwise adding.

According to the present invention, in the method for preparing the dual-cation fluorocarbon surfactant, preferably, the molar ratio of the compound represented by formula (b-2) to the compound represented by formula (b-3) is 1:1-3, more preferably is 1:1-2.

According to the present invention, the alcohol solvent may be any solvent that can dissolve the compound represented by formula (b-2) and can be used for the substitution reaction between the compound represented by formula (b-2) and the compound represented by formula (b-3), preferably is one or more of methanol, ethanol, n-propanol, isopropanol, and n-butanol. The amount of the alcohol solvent may vary within a wide range, as long as the above-mentioned substitution reaction can proceed successfully; however, to make the reaction proceed more fully and avoid wasting the solvent, preferably, with respect to 10 mmol compound represented by formula (b-2), the amount of the alcohol solvent is 30-100 mL (e.g., 30-60 mL).

According to the present invention, preferably, the conditions of the substitution reaction include: temperature of 60-100° C. (preferably 70-85° C.) and time of 4-10 h (preferably 5-8 h). To make the reaction proceed more fully, the alcohol solvent and the compound represented by formula (b-2) may be mixed first to dissolve the compound represented by formula (b-2) in the alcohol solvent, and then the compound represented by formula (b-3) may be introduced to have substitution reaction. Especially, the compound represented by formula (b-3) is introduced into the reaction system by dropwise adding.

According to the present invention, to extract the dual-cation fluorocarbon surfactant, the method may further comprise: cooling the product of the substitution reaction to room temperature (about 10-40° C.), and then carrying out solid-liquid separation, washing the solid phase, and drying the obtained solid, so as to obtain the dual-cation fluorocarbon surfactant.

According to the present invention, the additive composition may further contain conventional additives for drilling fluids in the art, such as one or more of anti-water blocking agent, weighting agent, and gel breaker, etc. When those additional additives are added into a drilling fluid, it can be deemed that the drilling fluid is formed with the additional additives as components of the additive composition in the present invention; of course, those additional additives may also be deemed as separate components of the drilling fluid rather than the components of the composition in the present invention. All those additional additives are included in the scope of the present invention.

The present invention further provides a use of the composition as an additive in drilling fluids.

The present invention further provides a water-based drilling fluid containing the above-mentioned composition.

According to the present invention, the water-based drilling fluid contains the additive composition provided in the present invention, and thereby can attain effects of higher penetration rate and lower residue rate, and achieve efficient coal-bed gas wells drilling and reduced damage to the coal-bed gas reservoir. Preferably, based on 100 pbw of water in the water-based drilling fluid, the content of the composition is 3-15 pbw, more preferably is 3-10 pbw, even more preferably is 4-8 pbw, further preferably is 5-6 pbw. In that case, based on 100 pbw of water in the water-based drilling fluid, the content of the tackifying and shear improver preferably is 1.5-5 pbw, more preferably is 2-3 pbw. In that case, based on 100 pbw of water in the water-based drilling fluid, the content of the capsulating agent preferably is 0.1-0.5 pbw, more preferably is 0.15-0.3 pbw. In that case, based on 100 pbw of water in the water-based drilling fluid, the content of the filtrate reducer preferably is 1-5 pbw, more preferably is 3-4 pbw. In that case, based on 100 pbw of water in the water-based drilling fluid, the amount of the amphiphobic wettability reversal agent preferably is 0.1-0.5 pbw.

According to the present invention, besides the additive composition provided in the present invention and water, the water-based drilling fluid may further contain a variety of conventional additives for water-based drilling fluids in the art, such as one or more of anti-water blocking agent and weighting agent, etc. Especially, the water-based drilling fluid is a brine drilling fluid; thus, the water-based drilling fluid contain a salt that serves as a weighting agent, and doesn't contain other solid phase particles (e.g., bentonite, barite, etc.), i.e., the water-based drilling fluid is a solid-free brine drilling fluid.

Wherein, the salt that serves as a weighting agent can adjust the density of the drilling fluid to required density; for example, the salt may be one or more of KCl, NaCl, KBr, and NaBr, etc.

Preferably, based on 100 pbw of water in the water-based drilling fluid, the content of the salt as a weighting agent is 5-10 pbw.

Wherein, the anti-water blocking agent has functions of reducing surface tension of the drilling fluid and preventing a water blocking damage; for example, the anti-water blocking agent may be one or more of polyoxyethylene octyl phenol ether, polyoxyethylene alkyl phenol ether, and the anti-water blocking agent disclosed in CN102887974A. Preferably, based on 100 pbw of water in the water-based drilling fluid, the content of the anti-water blocking agent is 0.1-0.5 pbw.

The above additives may be commercially available products, or may be prepared with conventional methods in the art. They will not be further detailed hereunder.

According to the present invention, the water-based drilling fluid (particularly the solid-free brine drilling fluid) can attain higher penetration rate and lower residue rate and is suitable for use in coal-bed gas wells drilling, and can achieve efficient coal-bed gas wells drilling and reduced damage to the coal-bed gas reservoir.

The present invention further provides a use of the water-based drilling fluid in coal-bed gas wells drilling.

Hereunder the present invention will be detailed in embodiments.

In the following embodiments and reference examples, the weight-average molecular weight and molecular weight distribution index are measured with a gel permeation chromatograph (GPC) (GPC E2695 from Waters Corporation (a US company)).

In the following preparation examples, the yield ratio of the nanocrystalline cellulose is calculated with the following formula:

$$\text{Yield ratio} = \frac{\text{Mass\_of\_nanocrystalline\_cellulose}}{\text{Mass\_of\_microcrystalline\_cellulose}} \times 100\%$$

In the following preparation examples, the micromorphology and average particle size of the nanocrystalline cellulose are measured with a JEM Transmission Electron Microscope (TEM) from JEOL (a Japanese company). The sample preparation method is: dropping the aqueous dispersion of nanocrystalline cellulose diluted to 0.1 wt. % concentration in droplets onto a copper micro grid coated with a carbon film, and dry the aqueous dispersion on the micro grid with an IR lamp.

Filtrate Reducer Preparation Example 1

(1) 40 g microcrystalline cellulose (from Hubei Zhongliao Chemical Co., Ltd., the average particle diameter of the particles is 20 μm) is added into 700 mL 64 wt. % of sulfuric acid solution, and the mixture is stirred at 45° C. for 3 h at 250 rpm;

(3) 3 L deionized water is added into the mixture obtained in the step (1) to terminate the hydrolytic reaction of the microcrystalline cellulose; the obtained suspension liquid is centrifuged at 11,000 rpm speed for 20 min, and then the solid obtained by centrifugation is washed with deionized water for several times, till the pH of the clear solution obtained by centrifugation is 7; the clean solid is dried at 105° C. for 12 h; thus, 35.28 g nanocrystalline cellulose, i.e., a filtrate reducer N1, is obtained, and the yield ratio is 88.2%. Measured by TEM, the average particle diameter of the nanocrystalline cellulose product is 239 nm, and the nanocrystalline cellulose is in a rod form.

Tackifying and Shear Improver Preparation Example 1

1 mol total amount of Acrylamide, N-vinyl pyrrolidone, and 3-[N,N-dimethyl-[2-(methyl acryloyloxy)ethyl]ammonium]propyl-1-sulfonate (at a molar ratio of 25:4:1) are added into 500 mL water, and the mixture is stirred at 30° C. for 30 min at 150 rpm; then, 0.01 mmol disodium ethylenediamine tetraacetate, 0.12 mmol 4,4'-azobis(4-cyanovaleric acid), and 0.14 mmol sodium acetate are added into the mixture, and nitrogen is charged for 15 min to remove oxygen; next, the mixture is held at 60° C. for 8 h for polymerization reaction; then, the polymerization product is dried at 90° C. for 2.5 h, and is milled to obtain a copolymer, i.e., a rheological modifier A1. The weight-average molecular weight of the polymer is 4,000,000 g/mol, and the molecular weight distribution coefficient of the polymer is 1.5; analyzed by infrared, $^1$H-NMR and $^{13}$C-NMR spectroscopy, the molar ratio of the structural units represented by formula (1) ($R^1$ and $R^{1'}$ are H) to the structural units represented by formula (2) ($R^4$, $R^2$ and $R^{2'}$ are H, $R^3$ is selected from C0 alkylene, and n=2) to the structural units represented by formula (3) ($R^5$ is methyl, $R^{5'}$ is H, X is selected from —O—, $R^6$ is selected from —CH$_2$—CH$_2$—, each $R^7$ is methyl, and $R^8$ is selected from —CH$_2$—CH$_2$—CH$_2$—) is 25:3.75:1.

Tackifying and Shear Improver Preparation Example 2

1 mol total amount of Methacrylamide, N-vinyl pyrrolidone, and [3-(methylacryloylamido)propyl]-dimethyl-(3-sulfopropyl) ammonium hydroxide (at a molar ratio of 20:4:1) are added into 500 mL water, and the mixture is stirred at 30° C. for 30 min at 200 rpm; then, 0.01 mmol disodium ethylenediamine tetraacetate, 0.14 mmol 2,2'-azobis[2-methylpropionamidine] dihydrochloride, and 0.15 mmol sodium formate are added into the mixture, and nitrogen is charged for 20 min to remove oxygen; next, the mixture is held at 50° C. for 10 h for polymerization reaction; then, the polymerization product is dried at 80° C. for 3 h, and is milled to obtain a copolymer, i.e., a rheological modifier A2. The weight-average molecular weight of the polymer is 3,200,000 g/mol, and the molecular weight distribution coefficient of the polymer is 2.2; analyzed by infrared, $^1$H-NMR and $^{13}$C-NMR spectroscopy, the molar ratio of the structural units represented by formula (1) ($R^1$ is methyl, $R^{1'}$ is H) to the structural units represented by formula (2) ($R^4$, $R^2$ and $R^{2'}$ are H, $R^3$ is selected from C0 alkylene, and n=2) to the structural units represented by formula (3) ($R^5$ and $R^{5'}$ are H, X is selected from —NH—, $R^6$ is selected from —CH$_2$—CH$_2$—CH$_2$, each $R^7$ is methyl, and $R^8$ is selected from —CH$_2$—CH$_2$—CH$_2$—) is 18:3.2:1.

Tackifying and Shear Improver Preparation Example 3

1 mol total amount of Acrylamide, N-vinyl pyrrolidone, and 3-[N,N-dimethyl-[2-(methylacryloyloxy) ethyl]ammonium]propyl-1-sulfonate (at a molar ratio of 25:4:1) are added into 400 mL water, and the mixture is stirred at 40° C. for 20 min at 200 rpm; then, 0.02 mmol disodium ethylenediamine tetraacetate, 0.12 mmol 4,4'-azobis(4-cyanovaleric acid), and 0.14 mmol sodium acetate are added into the mixture, and nitrogen is charged for 10 min to remove oxygen; next, the mixture is held at 70° C. for 7 h for polymerization reaction; then, the polymerization product is dried at 90° C. for 5 h, and is milled to obtain a copolymer, i.e., a rheological modifier A3. The weight-average molecular weight of the polymer is 3,000,000 g/mol, and the molecular weight distribution coefficient of the polymer is 2.8; analyzed by infrared, $^1$H-NMR and $^{13}$C-NMR spectroscopy, the molar ratio of the structural units represented by formula (1) ($R^1$ and $R^{1'}$ are H) to the structural units represented by formula (2) ($R^4$, $R^2$ and $R^{2'}$ are H, $R^3$ is selected from C0 alkylene, and n=2) to the structural units represented by formula (3) ($R^5$ is methyl, $R^{5'}$ is H, X is selected from —O—, $R^6$ is selected from —CH$_2$—CH$_2$—, each $R^7$ is methyl, and $R^8$ is selected from —CH$_2$—CH$_2$—CH$_2$—) is 22:3.5:1.

Tackifying and Shear Improver Preparation Example 4

The method described in the tackifying and shear improver preparation example 1 is used, but the difference is that the amount of water as the solvent of the reaction system is 1,000 mL; thus, a copolymer is obtained finally after milling, i.e., a rheological modifier A4. The weight-average molecular weight of the polymer is 2,400,000 g/mol, and the molecular weight distribution coefficient of the polymer is 1.7; analyzed by infrared, $^1$H-NMR and $^{13}$C-NMR spectroscopy, the molar ratio of the structural units represented by formula (1) ($R^1$ and $R^{1'}$ are H) to the structural units represented by formula (2) ($R^4$, $R^2$ and $R^{2'}$ are H, $R^3$ is selected from C0 alkylene, and n=2) to the structural units represented by formula (3) ($R^5$ is methyl, $R^{5'}$ is H, X is selected from —O—, $R^6$ is selected from —CH$_2$—CH$_2$—, each $R^7$ is methyl, and $R^8$ is selected from —CH$_2$—CH$_2$—CH$_2$—) is 25:3.75:1.

Tackifying and Shear Improver Preparation
Example 5

The method described in the tackifying and shear improver preparation example 1 is used, but the difference is that the temperature of the polymerization reaction is 30° C. after nitrogen is charged for removing oxygen; thus, a copolymer is obtained finally after milling, i.e., a rheological modifier A5. The weight-average molecular weight of the polymer is 5,100,000 g/mol, and the molecular weight distribution coefficient of the polymer is 2.0; analyzed by infrared, $^1$H-NMR and $^{13}$C-NMR spectroscopy, the molar ratio of the structural units represented by formula (1) ($R^1$ and $R^{1'}$ are H) to the structural units represented by formula (2) ($R^4$, $R^2$ and $R^{2'}$ are H, $R^3$ is selected from C0 alkylene, and n=2) to the structural units represented by formula (3) ($R^5$ is methyl, $R^{5'}$ is H, X is selected from —O—, $R^6$ is selected from —CH$_2$—CH$_2$—, each $R^7$ is methyl, and $R^8$ is selected from —CH$_2$—CH$_2$—CH$_2$—) is 25:3.9:1.

Tackifying and Shear Improver Preparation
Comparative Example 1

The method described in the tackifying and shear improver preparation example 1 is used, but the difference is that 3-[N,N-dimethyl-[2-(methylacryloyloxy)ethyl]ammonium]propyl-1-sulfonate is not used; instead, acrylamide and N-vinyl pyrrolidone are used at 6:1 molar ratio as monomers, and the total amount of the monomers is 1 mol; thus, a copolymer is obtained, i.e., a rheological modifier DA1. The weight-average molecular weight of the polymer is 4,400,000 g/mol, and the molecular weight distribution coefficient of the polymer is 1.6.

Tackifying and Shear Improver Preparation
Comparative Example 2

The method described in the tackifying and shear improver preparation example 1 is used, but the difference is that N-vinyl pyrrolidone is not used; instead, acrylamide and 3-[N,N-dimethyl-[2-(methylacryloyloxy)ethyl]ammonium]propyl-1-sulfonate are used at 25:1 molar ratio as monomers, and the total amount of the monomers is 1 mol; thus, a copolymer is obtained, i.e., a rheological modifier DA2. The weight-average molecular weight of the polymer is 3,200,000 g/mol, and the molecular weight distribution coefficient of the polymer is 2.4.

Capsulating Agent Preparation Example 1

(1) 100 g starch (from Sun Chemical Technology (Shanghai) Co., Ltd., the molecular weight is 1,000,000 g/mol) is dissolved in 3,000 g water, and 12 g acetic acid and 30 g chlorosulfonic acid are added, the mixture is stirred to a homogeneous state, and then held at 60° C. for 12 h for reaction; the obtained product is filtered by suction filtration, and the obtained solid is dried; thus, sulfonated starch SS-1 is obtained. analyzed by IR and NMR spectroscopy, the content of sulfur-bearing groups in the sulfonated starch is 28.5 wt. %;

(2) 100 g sulfonated starch SS-1 is dissolved in 7,000 g water, and 700 g acrylamide and 200 g acrylic acid are added, the mixture is stirred to a homogeneous state and then nitrogen is charged into the mixture for 15 min; then, 0.2 g ammonium ceric nitrate is added, and the mixture reacts at 25° C. for 24 h; then, the product is dried and milled; thus, a comb-like polysaccharide compound, i.e., a capsulating agent C1, is obtained. The weight-average molecular weight of the comb-like polysaccharide compound is 13,500,000 g/mol. Analyzed by IR and NMR spectroscopy, the molar ratio of the structural units provided by acrylamide and acrylic acid that form the side chains of the comb-like polysaccharide compound is 1:0.27, and the content of the structural units provided by acrylamide and acrylic acid is 90 wt. %.

Capsulating Agent Preparation Example 2

(1) 100 g carboxymethyl cellulose (from Sun Chemical Technology (Shanghai) Co., Ltd., the molecular weight is 700,000 g/mol) is dissolved in 2,000 g water, and 12 g acetic acid and 30 g chlorosulfonic acid are added, the mixture is stirred to a homogeneous state, and then held at 55° C. for 10 h for reaction; the obtained product is filtered by suction filtration, and the obtained solid is dried; thus, sulfonated carboxymethyl cellulose SC-1 is obtained. analyzed by IR and NMR spectroscopy, the content of sulfur-bearing groups in the sulfonated carboxymethyl cellulose is 29.1 wt. %;

(2) 100 g sulfonated carboxymethyl cellulose SC-1 is dissolved in 8,000 g water, and 710 g acrylamide and 240 g acrylic acid are added, the mixture is stirred to a homogeneous state and then nitrogen is charged into the mixture for 20 min; then, 0.5 g ammonium persulfate is added, and the mixture reacts at 25° C. for 22 h; then, the product is dried and milled; thus, a comb-like polysaccharide compound, i.e., a capsulating agent C2, is obtained. The weight-average molecular weight of the comb-like polysaccharide compound is 12,500,000 g/mol. Analyzed by IR and NMR spectroscopy, the molar ratio of the structural units provided by acrylamide and acrylic acid that form the side chains of the comb-like polysaccharide compound is 1:0.3, and the content of the structural units provided by acrylamide and acrylic acid is 90.5 wt. %.

Capsulating Agent Preparation Example 3

(1) 100 g hydroxypropyl methyl cellulose (from Sun Chemical Technology (Shanghai) Co., Ltd., the molecular weight is 150,000 g/mol) is dissolved in 2,000 g water, and 15 g acetic acid and 28 g sulfuric anhydride are added, the mixture is stirred to a homogeneous state, and then held at 55° C. for 10 h for reaction; the obtained product is filtered by suction filtration, and the obtained solid is dried; thus, sulfonated hydroxypropyl methyl cellulose SC-2 is obtained. Analyzed by IR and NMR spectroscopy, the content of sulfur-bearing groups in the sulfonated hydroxypropyl methyl cellulose is 25.6 wt. %;

(2) 100 g sulfonated hydroxypropyl methyl cellulose SC-2 is dissolved in 6,500 g water, and 720 g methacrylamide and 230 g methacrylic acid are added, the mixture is stirred to a homogeneous state and then nitrogen is charged into the mixture for 10 min; then, 0.5 g ammonium persulfate is added, and the mixture reacts at 30° C. for 20 h; then, the product is dried and milled; thus, a comb-like polysaccharide compound, i.e., a capsulating agent C3, is obtained. The weight-average molecular weight of the comb-like polysaccharide compound is 12,000,000 g/mol. Analyzed by IR and NMR spectroscopy, the molar ratio of the structural units provided by methacrylamide and methacrylic acid that form the side chains of the comb-like polysaccharide compound is 1:0.31, and the content of the structural units provided by methacrylamide and methacrylic acid is 90.5 wt. %.

Capsulating Agent Preparation Example 4

(1) Sulfonated starch SS-1 is prepared through the step (1) described in the capsulating agent preparation example 1;

(2) The step (2) described in the capsulating agent preparation example 1 is used, but the difference is that the amount of acrylamide is 620 g, the amount of acrylic acid is 180 g; thus, a comb-like polysaccharide compound, i.e., a capsulating agent C4, is obtained finally. The weight-average molecular weight of the comb-like polysaccharide compound is 9,500,000 g/mol. Analyzed by IR and NMR spectroscopy, the molar ratio of the structural units provided by acrylamide and acrylic acid that form the side chains of the comb-like polysaccharide compound is 1:0.26, and the content of the structural units provided by acrylamide and acrylic acid is 88.9 wt. %.

Capsulating Agent Preparation Example 5

(1) Sulfonated starch SS-1 is prepared through the step (1) described in the capsulating agent preparation example 1;

(2) The step (2) described in the capsulating agent preparation example 1 is used, but the difference is that the amount of acrylamide is 880 g, the amount of acrylic acid is 220 g; thus, a comb-like polysaccharide compound, i.e., a capsulating agent C5, is obtained finally. The weight-average molecular weight of the comb-like polysaccharide compound is 14,500,000 g/mol. Analyzed by IR and NMR spectroscopy, the molar ratio of the structural units provided by acrylamide and acrylic acid that form the side chains of the comb-like polysaccharide compound is 1:0.24, and the content of the structural units provided by acrylamide and acrylic acid is 91.7 wt. %.

Capsulating Agent Preparation Comparative Example 1

The sulfonated starch SS-1 prepared in the step (1) in the capsulating agent preparation example b1 is used as a capsulating agent DC1.

Capsulating Agent Preparation Comparative Example 2

(1) Sulfonated starch SS-1 is prepared through the step (1) described in the capsulating agent preparation example 1;

(2) The step (2) described in the capsulating agent preparation example 1 is used, but the difference is that acrylic acid is not used, and the amount of the acrylamide is increased to 900 g; thus, a comb-like polysaccharide compound, i.e., a capsulating agent DC2, is obtained finally. The weight-average molecular weight of the comb-like polysaccharide compound is 14,000,000 g/mol. Analyzed by IR and NMR spectroscopy, the side chains in the comb-like polysaccharide compound are provided solely by acrylamide, and the content of the structural units provided by acrylamide is 90 wt. %.

Capsulating Agent Preparation Comparative Example 3 of

AB1000 polyacrylamide with 10,600,000 g/mol weight-average molecular weight purchased from Tianrun Chemical Co., Ltd. is used as a capsulating agent DC3.

Reversal Agent Intermediate Preparation Example 1

0.12 mol N,N'-dimethyl-1,3-propylene diamine is dissolved in 250 mL dichloromethane at 0-5° C., 0.12 mol triethylamine is added, and the mixture is mixed and stirred for 30 min; then, 0.1 mol perfluoro-butyl sulfuryl fluoride is added by dropwise adding at 0-5° C. (added completely within about 30 min, purchased from Hubei Jusheng Technology Co., Ltd. with a trade mark 375-72-4), and the mixture is held at 0-5° C. for 60 min for reaction, and then is held at 25° C. for 4 h for reaction; the obtained product is filtered, the filter cake is washed with dichloromethane, dried, and then recrystallized with acetone; thus, 128.7 g white solid is obtained. Analysis by infrared, $^1$H-NMR and $^{13}$C-NMR spectroscopy, the solid is the compound represented by formula (b-2-1).

Reversal Agent Intermediate Preparation Example 2

0.12 mol N,N'-dimethyl-1,3-propylene diamine is dissolved in 250 mL dichloromethane at 0-5° C., 0.12 mol triethylamine is added, and the mixture is mixed and stirred for 30 min; then, 0.1 mol perfluoro-hexyl sulfuryl fluoride is added by dropwise adding at 0-5° C. (added completely within about 30 min, purchased from Hubei xinmingtai Chemical Co., Ltd. with a trade mark 423-50-7), and the mixture is held at 0-5° C. for 60 min For reaction, and then is held at 25° C. for 4 h for reaction; the obtained product is filtered, the filter cake is washed with dichloromethane, dried, and then recrystallized with acetone; thus, 125.3 g white solid is obtained. Analysis by infrared, $^1$H-NMR and $^{13}$C-NMR spectroscopy, the solid is the compound represented by formula (b-2-2).

Reversal Agent Intermediate Preparation Example 3

0.12 mol N,N'-dimethyl-1,3-propylene diamine is dissolved in 300 ml dichloromethane at 0-5° C., 0.12 mol triethylamine is added, and the mixture is mixed and stirred for 30 min; then, 0.1 mol perfluoro-octyl sulfuryl fluoride is added by dropwise adding at 0-5° C. (added completely within about 30 min, purchased from Shanghai Yijing Industrial Co., Ltd. with a trade mark 307-35-7), and the mixture is held at 0-5° C. for 60 min for reaction, and then is held at 25° C. for 4 h for reaction; the obtained product is filtered, the filter cake is washed with dichloromethane, dried, and then recrystallized with acetone; thus, 127.4 g white solid is obtained. Analysis by infrared, $^1$H-NMR and $^{13}$C-NMR spectroscopy, the solid is the compound represented by formula (b-2-3).

Amphiphobic Wettability Reversal Agent Preparation Example 1

10 mmol compound represented by formula (b-2-1) is dissolved in 50 mL ethanol at 65° C., and then 11 mmol 1,4-dibromobutane is added by dropwise adding (added completely within about 20 min), and the mixture is stirred for 6 h at 75° C. for reaction; the reaction product is cooled to room temperature (about 25° C.) for crystallization, and then is filtered, and the filter cake is washed and dried; thus, 12.34 g solid is obtained. Analyzed by infrared, $^1$H-NMR and $^{13}$C-NMR spectroscopy, the solid is the amphiphobic wettability reversal agent RA1 in which the groups represented by formula (a-1) are cations and bromine ions are anions.

Amphiphobic Wettability Reversal Agent Preparation Example 2

10 mmol compound represented by formula (b-2-2) is dissolved in 50 mL ethanol at 65° C., and then 11 mmol 1,4-dibromobutane is added by dropwise adding (added completely within about 20 min), and the mixture is stirred for 6 h at 75° C. for reaction; the reaction product is cooled to room temperature (about 25° C.) for crystallization, and then is filtered, and the filter cake is washed and dried; thus, 12.43 g solid is obtained. Analyzed by infrared, $^1$H-NMR and $^{13}$C-NMR spectroscopy, the solid is the amphiphobic wettability reversal agent RA2 in which the groups represented by formula (a-2) are cations and bromine ions are anions.

Amphiphobic Wettability Reversal Agent Preparation Example 3

10 mmol compound represented by formula (b-2-3) is dissolved in 60 mL isopropanol at 55° C., and then 12 mmol 1,4-dibromobutane is added by dropwise adding (added completely within about 20 min), and the mixture is stirred for 7 h at 85° C. for reaction; the reaction product is cooled to room temperature (about 25° C.) for crystallization, and then is filtered, and the filter cake is washed and dried; thus, 12.54 g solid is obtained. Analyzed by infrared, $^1$H-NMR and $^{13}$C-NMR spectroscopy, the solid is the amphiphobic wettability reversal agent RA3 in which the groups represented by formula (a-3) are cations and bromine ions are anions.

Amphiphobic Wettability Reversal Agent Preparation Example 4

The method described in the amphiphobic wettability reversal agent preparation example 1 is used, but 1,6-dibromo-hexane is used in replacement of 1,4-dibromobutane; finally, 11.87 g solid is obtained. Analyzed by infrared, $^1$H-NMR and $^{13}$C-NMR spectroscopy, the solid is the amphiphobic wettability reversal agent RA4 in which the groups represented by formula (a-4) are cations and bromine ions are anions.

Comparative Amphiphobic Wettability Reversal Agent Preparation Example 1

10 mmol compound represented by formula (b-2-3) is dissolved in 50 mL ethanol at 65° C., and then 11 mmol sodium 2-hydroxy-3-chloropropanesulfonate is added by dropwise adding (added completely within about 20 min), the pH is adjusted to 9 with sodium hydroxide solution, and the mixture is stirred for 6 h at 85° C. for reaction; the reaction product is cooled to room temperature (about 25° C.) for crystallization, and then is filtered, and the filter cake is washed and dried; thus, 10.54 g solid is obtained. Analyzed by infrared, $^1$H-NMR and $^{13}$C-NMR spectroscopy, the solid is amphiphobic wettability reversal agent DRA1 represented by formula

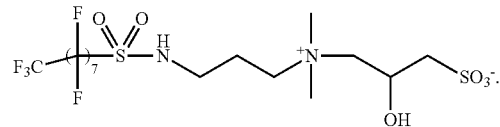

Test Case 1

1. Measurement of Amphiphobic Property of Rock Surface:

1 wt. % water solution of the amphiphobic wettability reversal agent is prepared as the fluid to be tested, 1 wt. % water solution of hexadecyl trimethyl ammonium bromide is prepared (as a comparative amphiphobic wettability reversal agent DRA2), 1 wt. % water solution of alkyl polyoxyethylene ether sulfate (purchased from Jiangsu Haian Petrochemical Plant) is prepared (as a comparative amphiphobic wettability reversal agent DRA3), and 1 wt. % water solution of nonyl phenol polyoxyethylene ether (purchased from Jiangsu Haian Petrochemical Plant) is prepared (as a comparative amphiphobic wettability reversal agent DRA4), respectively, and an artificial rock core is immersed in each of the solution for 8 h at 160° C.; the rock cores are taken out, and cooled and dried naturally, and then the contact angles $\theta_o$ and $\theta_w$ of oil phase and water phase on the surfaces of rock cores are measured with a contact angle meter (JC2000D3 contact angle meter from Shanghai Zhongchen Digital Technology and Equipment Co., Ltd.). The results are shown in Table 1, wherein, the oil phase test liquid is n-hexadecane, and the water phase test liquid is distilled water.

2. Surface Tension Test:

The surface tension is measured with a TX-500C full-range spinning drop interfacial tensiometer with a spinning drop method. The main process of the spinning drop method includes: the liquid to be tested is added in an appropriate amount into a sample tube (the above-mentioned amphiphobic wettability reversal agent and the amphiphobic wettability reversal agents in the comparative examples are dissolved in distilled water to prepare solutions at different concentrations, see table 1 for the details), a bubble in appropriate size is squeezed into the sample tube, so that gas and liquid phases are formed in the sample tube; then, the sample tube is centrifuged at a high rotation speed ω=7,000 r/min, so that the low-density bubble is elongated in the high-density solution under the actions of centrifugal force, gravity, and interfacial tension. The diameter of the elongated bubble is measured, and the surface tension in the state is calculated from the diameter and the given difference in density between the two phases; in addition, the measurement temperature is 25° C. The results are shown in Table 1.

3. Influence of Wettability on Dynamic Capillary Spontaneous Imbibition

A SWT rock core spontaneous water imbibition evaluation system from Jingzhou Modern Oil Technology Development Co., Ltd. is used, liquid-wetted rock core columns and gas-wetted rock core columns are prepared from dense rock cores with similar permeability respectively (the mass fraction of the amphiphobic wettability reversal agent is 2 wt. % in the treatment), and a spontaneous imbibition test is carried out at room temperature (about 25° C.); in the test, air is the gas phase, and saline water and kerosene are liquid phases, wherein, the saline water is 12 wt. % NaCl solution (with 1.07 g/cm³ density), the density of kerosene is 0.78 g/cm³. The dynamic conditions of spontaneous oil and water imbibition of the rock cores and the final degree of liquid saturation from spontaneous imbibition are logged respectively, and the gas permeability of the rock cores after spontaneous imbibition is tested (see Table 2 for the results).

TABLE 1

| Amphiphobic wettability reversal agent | $\theta_w/(°)$ | $\theta_o/(°)$ | Surface tension at different concentrations (mN/m) | | |
|---|---|---|---|---|---|
| | | | 0.05 wt. % | 0.10 wt. % | 0.20 wt. % |
| Distilled water | 0 | 0 | / | / | / |
| RA1 | 102.56 | 75.99 | 16.4 | 16.4 | 16.4 |
| RA2 | 104.32 | 74.68 | 16.5 | 16.4 | 16.4 |
| RA3 | 103.21 | 73.86 | 16.4 | 16.5 | 16.4 |
| RA4 | 105.02 | 75.45 | 16.5 | 16.4 | 16.5 |
| DRA1 | 92.56 | 69.12 | 20.2 | 20.2 | 20.1 |
| DRA2 | 76.23 | 48.82 | 38.1 | 38.2 | 38.1 |
| DRA3 | 75.66 | 49.54 | 38.2 | 38.1 | 38.1 |
| DRA4 | 77.14 | 49.08 | 38.1 | 38.1 | 38.1 |

It is seen from the results in Table 1: the amphiphobic wettability reversal agent provided in the present invention makes the rock surface amphiphobic, wherein, the water wetting angle is up to 100° or above, and the n-hexadecane wetting angle is up to 70° or above; in addition, the surface tension is decreased.

TABLE 2

| Agent | $V_p$ | $m_0$ | Liquid | m (single) | s (single) | m (reverse) | s (reverse) |
|---|---|---|---|---|---|---|---|
| Blank | 1.875 | 69.38 | Saline water | 70.55 | 62.47 | 70.90 | 81.12 |
| | 1.757 | 68.69 | Kerosene | 69.53 | 59.75 | 69.81 | 79.43 |
| RA1 | 1.744 | 68.53 | Saline water | 68.79 | 18.84 | 68.90 | 26.34 |
| | 1.704 | 68.07 | Kerosene | 68.31 | 17.24 | 68.51 | 32.16 |
| RA2 | 1.742 | 68.51 | Saline water | 68.83 | 18.62 | 68.87 | 26.03 |
| | 1.704 | 68.05 | Kerosene | 68.28 | 17.12 | 68.49 | 31.95 |
| RA3 | 1.748 | 68.51 | Saline water | 68.77 | 18.89 | 68.88 | 26.41 |
| | 1.706 | 68.05 | Kerosene | 68.29 | 17.28 | 68.49 | 32.22 |
| RA4 | 1.738 | 68.42 | Saline water | 68.68 | 18.76 | 68.78 | 26.25 |
| | 1.702 | 68.02 | Kerosene | 68.25 | 17.18 | 68.46 | 32.13 |
| DRA1 | 1.756 | 68.52 | Saline water | 68.80 | 19.79 | 69.03 | 36.45 |
| | 1.712 | 68.12 | Kerosene | 68.37 | 18.16 | 68.71 | 42.83 |
| DRA2 | 1.795 | 68.84 | Saline water | 69.22 | 26.44 | 69.39 | 38.21 |
| | 1.722 | 68.47 | Kerosene | 68.81 | 24.95 | 69.07 | 43.48 |
| DRA3 | 1.798 | 68.84 | Saline water | 69.22 | 26.43 | 69.38 | 37.46 |
| | 1.722 | 68.46 | Kerosene | 68.80 | 24.93 | 69.05 | 43.04 |
| DRA4 | 1.798 | 68.84 | Saline water | 69.22 | 26.45 | 69.38 | 37.47 |
| | 1.724 | 68.46 | Kerosene | 68.80 | 24.94 | 69.05 | 43.03 |

Note:
"blank" represents no amphiphobic agent; "$V_p$" represents volume of permeation; "$m_0$" represents mass of permeation; "m(single)" represents rock core mass after spontaneous imbibition in single direction; "s(single)" represents degree of liquid saturation in the rock core after spontaneous imbibition in single direction; "m(reverse)" represents rock core mass after spontaneous imbibition in reverse direction; "s(reverse)" represents degree of liquid saturation in the rock core after spontaneous imbibition in reverse direction.

It is seen from Table 2: after the dual-cation fluorocarbon surfactant obtained in the present invention is added as an amphiphobic wettability reversal agent, all of the "$V_p$", "$M_0$", "m(single)", "s(single)", "m(reverse)", and "s(reverse)" are decreased, indicating that the dual-cation fluorocarbon surfactant obtained in the present invention has a favorable amphiphobic effect.

Embodiment 1

This embodiment is provided to describe the composition and the water-based drilling fluid in the present invention.

Formulation of the water-based drilling fluid: 100 pbw water, 3.5 pbw filtrate reducer N1, 2 pbw rheological modifier A1, 0.15 pbw capsulating agent C1, 0.1 pbw amphiphobic wettability reversal agent RA1, 0.4 pbw anti-water blocking agent (polyoxyethylene octyl phenol ether from Jinan Yingchu Chemical Technology Co., Ltd.), and 5 pbw KCl; thus, a drilling fluid Y1 is obtained, and the density of the drilling fluid is 1.1 g/cm³.

Embodiment 2

This embodiment is provided to describe the composition and the water-based drilling fluid in the present invention.

The formulation of the water-based drilling fluid described in the embodiment 1 is used, but the difference is that the rheological modifier A1 is replaced with the rheological modifier A2, and the capsulating agent C1 is replace with the capsulating agent C2; thus, a drilling fluid Y2 is obtained, and the density of the drilling fluid is 1.1 g/cm³.

Embodiment 3

This embodiment is provided to describe the composition and the water-based drilling fluid in the present invention.

The formulation of the water-based drilling fluid described in the embodiment 1 is used, but the difference is that the rheological modifier A1 is replaced with the rheological modifier A3, and the capsulating agent C1 is replace with the capsulating agent C3; thus, a drilling fluid Y3 is obtained, and the density of the drilling fluid is 1.1 g/cm³.

Embodiment 4

This embodiment is provided to describe the composition and the water-based drilling fluid in the present invention.

The formulation of the water-based drilling fluid described in the embodiment 1 is used, but the difference is that the rheological modifier A1 is replaced with the rheological modifier A4, and the capsulating agent C1 is replace with 0.2 pbw capsulating agent C4; thus, a drilling fluid Y4 is obtained, and the density of the drilling fluid is 1.1 g/cm³.

Embodiment 5

This embodiment is provided to describe the composition and the water-based drilling fluid in the present invention.

The formulation of the water-based drilling fluid described in the embodiment 1 is used, but the difference is that the rheological modifier A1 is replaced with the rheological modifier A5, and the capsulating agent C1 is replace with the capsulating agent C5; thus, a drilling fluid Y5 is obtained, and the density of the drilling fluid is 1.1 g/cm³.

Reference Example 1

The formulation of the water-based drilling fluid described in the embodiment 1 is used, but the difference is that the rheological modifier A1 is replaced with the rheological modifier DA1, the capsulating agent C1 is replace with the capsulating agent DC1, and the amphiphobic wettability reversal agent RA1 is omitted; thus, a drilling fluid DY1 is obtained, and the density of the drilling fluid is 1.1 g/cm³.

Reference Example 2

The formulation of the water-based drilling fluid described in the embodiment 1 is used, but the difference is that the rheological modifier A1 is replaced with the rheological modifier DA2, the capsulating agent C1 is replace with the capsulating agent DC2, and the amphiphobic wettability reversal agent RA1 is omitted; thus, a drilling fluid DY2 is obtained, and the density of the drilling fluid is 1.1 g/cm³.

Reference Example 3

The formulation of the water-based drilling fluid described in the embodiment 1 is used, but the difference is that the rheological modifier A1 is replaced with the rheological modifier DA2, the capsulating agent C1 is replace with the capsulating agent DC3, and the amphiphobic wettability reversal agent RA1 is omitted; thus, a drilling fluid DY3 is obtained, and the density of the drilling fluid is 1.1 g/cm³.

Reference Example 4

The formulation of the water-based drilling fluid described in the embodiment 1 is used, but the difference is that the filtrate reducer N1 is replaced with modified starch (LYS modified starch from Shandong Deshunyuan Petroleum Technology Co., Ltd.), the rheological modifier A1 is replaced with partially hydrolyzed polyacrylamide (A1225 from Renqiu Kewei Chemical Co., Ltd.), the capsulating agent C1 is replaced with potassium polyacrylate (HNQ from Hebei Yanxing Chemical Co., Ltd.), and the amphiphobic wettability reversal agent RA1 is omitted; thus, a drilling fluid DY4 is obtained, and the density of the drilling fluid is 1.1 g/cm³.

Test Case 3

The rheology property, fluid loss property, and surface tension of the above drilling fluids are measured; specifically, the apparent viscosity (AV), plastic viscosity (PV), yield point (YP), ratio of yield point to plastic viscosity, initial static shear force, final static shear force, intermediate pressure filter loss (API), and surface tension of the above drilling fluid before aging are measured. The results are shown in Table 3, wherein:

The apparent viscosity (AV) is measured with a FANN six-speed viscosity meter with the method specified in the national standard GB/T29170-2012, in unit of mPa·s, $$AV = \frac{1}{2}\theta_{600}.$$

The plastic viscosity (PV) is measured with a FANN six-speed viscosity meter with the method specified in the national standard GB/T29170-2012, in unit of mPa·s, $PV=\theta_{600}-\theta_{300}$.

The yield point (YP) is measured with a FANN six-speed viscosity meter with the method specified in the national standard GB/T29170-2012, $YP=0.511\times(2\times\phi300-\phi600)$, in unit of Pa.

The initial static shear force is calculated with the following method: agitate for 10 s at 600 r/min. speed, hold for 10 s, and read the maximum reading at $\phi3$, and then divided the maximum reading by 2 to obtain initial static shear force.

The final static shear force is calculated with the following method: agitate for 10 s at 600 r/min. speed, hold for 10 min., and read the maximum reading at $\phi3$, and then divided the maximum reading by 2 to obtain final static shear force.

The ratio of yield point to plastic viscosity is calculated with the following formula:

$$\text{Ratio of yield point to plastic viscosity} = \frac{YP}{\varphi600 - \varphi300}$$

API refers to intermediate pressure filter loss, and is measured with an API filter loss meter with the method specified in the standard SY/T5621-93, in unit of mL.

The surface tension is measured with a contact angle meter with a pendent drop method as per the standard GB/T22237-2008.

TABLE 3

| Drilling fluid | AV mPa·s | PV mPa·s | YP Pa | Ratio of yield point to plastic viscosity Pa/(mPa·s) | Initial static shear force Pa | Final static shear orce Pa | API filter loss mL | Surface tension mN/m |
|---|---|---|---|---|---|---|---|---|
| Y1 | 32.35 | 21 | 11.35 | 0.54 | 4.5 | 6 | 3.7 | 18.1 |
| Y2 | 29.13 | 19 | 10.13 | 0.533 | 4.5 | 7 | 4.1 | 18.4 |
| Y3 | 28.25 | 19 | 9.25 | 0.487 | 3 | 5 | 5.7 | 17.8 |
| Y4 | 24.2 | 17 | 7.20 | 0.42 | 3.5 | 4.5 | 5.9 | 18.5 |
| Y5 | 32.46 | 22 | 10.46 | 0.475 | 4 | 5 | 5.5 | 17.3 |
| DY1 | 19 | 15 | 4.09 | 0.272 | 1.5 | 1.5 | 18.2 | 23.1 |
| DY2 | 17.5 | 13 | 4.60 | 0.354 | 1.5 | 2 | 21.4 | 24.5 |
| DY3 | 18 | 14 | 4.09 | 0.292 | 1 | 1.5 | 17.0 | 25.2 |
| DY4 | 16 | 15 | 1.02 | 0.068 | 0.5 | 0.5 | 19.9 | 22.2 |

It is seen from the data in the Table 3: the drilling fluid provided in the present invention has excellent rheology property, lower viscosity, and higher yield point and static shear force, can maintain a ratio of yield point to plastic viscosity equal to or greater than 0.30, and can carry and suspend coal rock cuttings successfully; the drilling fluid provided in the present invention has lower filter loss, and can greatly reduce the leakage of free water in the drilling fluid to the coal seam; in addition, the drilling fluid provided in the present invention has low surface tension, can effectively avoid the occurrence of a water blocking phenomenon incurred by capillary force and thereby maintains coal-bed gas seepage channels in good condition and has favorable reservoir protection performance.

Test Case 4

The residue rates of the above drilling fluids are measured; the results are shown in Table 4. The specific process includes: 0.05 wt. % of potassium persulfate as gel breaker is added into 300 mL drilling fluid prepared above, the mixture is stirred to a homogeneous state and then held at 90° C. for 4 h, to accomplish gel breaking fully; the drilling fluid in a specific volume V after gel breaking is loaded into a centrifugal machine and centrifuged at 10,000 rpm for 30 min, then the supernatant liquid is poured out, distilled water is added into the treated drilling fluid, and then the drilling fluid is further centrifuged at 10,000 rpm for 30 min; next, the supernatant liquid is poured out, the remaining drilling fluid is dried at 90° C., and the mass m of the residue after the drilling fluid is dried is measured; the residue rate is calculated with the following formula:

residue rate=m/V, in unit of mg/L.

TABLE 4

| Drilling fluid | Residue rate mg/L |
|---|---|
| Y1 | 32 |
| Y2 | 28 |
| Y3 | 30 |
| Y4 | 26 |
| Y5 | 28 |
| DY4 | 112 |

It is seen from the data in the Table 4: all tested drilling fluids have a residue rate equal to or lower than 35 mg/L, except the comparative example DY4. The result indicates that the gel breaker can act well on the additive composition provided in the present invention, and can effectively deactivate or degrade the treating agents; thus, the level of residue is very low. That property is helpful for the reverse discharging work after coal-bed gas wells drilling, and the low residue rate ensures lower damage of the drilling fluid additives to the reservoir. The result indicates that the drilling fluid provided in the present invention is quite suitable for use in coal-bed gas wells drilling operation.

While some preferred embodiments of the present invention are described above, the present invention is not limited to the details in those embodiments. Those skilled in the art can make modifications and variations to the technical scheme of the present invention, without departing from the spirit of the present invention. However, all these modifications and variations shall be deemed as falling into the protected scope of the present invention.

In addition, it should be noted that the specific technical features described in above embodiments can be combined in any appropriate form, provided that there is no conflict. To avoid unnecessary repetition, the possible combinations are not described specifically in the present invention.

Moreover, different embodiments of the present invention can be combined freely as required, as long as the combinations don't deviate from the ideal and spirit of the present invention. However, such combinations shall also be deemed as falling into the scope disclosed in the present invention.

The invention claimed is:

1. A coal-bed gas well drilling fluid additive composition, comprising a tackifying and shear improver, a capsulating agent, a filtrate reducer, and an amphiphobic wettability reversal agent, wherein:

the tackifying and shear improver is a copolymer comprising structural units represented by formula (1), structural units represented by formula (2), and structural units represented by formula (3), wherein:

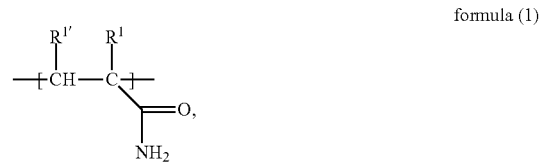

formula (1)

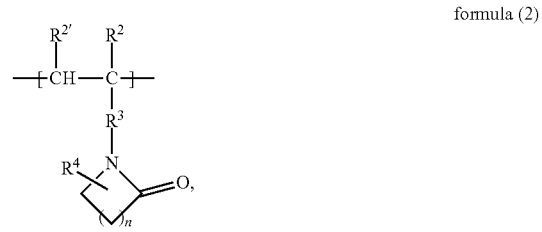

formula (2)

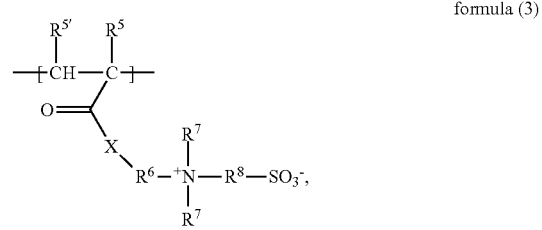

formula (3)

wherein $R^1$, $R^{1'}$, $R^2$, $R^{2'}$, $R^5$, $R^{5'}$, $R^4$ and each $R^7$ are independently selected from H and C1-C8 alkyl; $R^3$, $R^6$ and $R^8$ are independently selected from C0-C8 alkylene; X is selected from —NH— and —O—; n is 1-4;

the capsulating agent is a comb-like polysaccharide compound, comprising side chains and a main chain; the side chains are provided by a compound represented by formula (I) and a compound represented by formula (II), and the main chain is provided by a sulfonated polysaccharide compound, wherein, the sulfonated polysaccharide compound is selected from a sulfonated starch, a sulfonated cellulose compound, and a sulfonated xanthan gum:

formula (I)

formula (II)

wherein, $L^1$, $L^{1'}$, $L^2$ and $L^{2'}$ are independently selected from H and C1-C6 alkyl;

the filtrate reducer is nanocrystalline cellulose, and the amphiphobic wettability reversal agent is a dual-cation fluorocarbon surfactant of which the cation part is represented by formula (a):

formula (a)

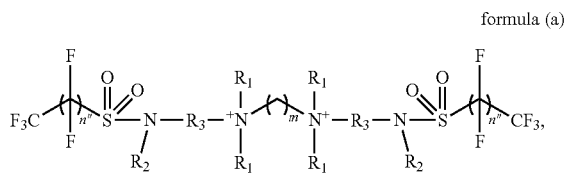

wherein, each $R_1$ is independently selected from C1-C6 alkyl, each $R_2$ is independently selected from H and C1-C6 alkyl, each $R_3$ is independently selected from C1-C10 alkylene, each n" is independently selected from 3-15, and m is 1-10.

2. The composition according to claim 1, wherein a weight ratio of the tackifying and shear improver to the capsulating agent to the filtrate reducer to the amphiphobic wettability reversal agent is 100:5-50:100-300:5-100.

3. The composition according to claim 2, wherein a weight ratio of the tackifying and shear improver to the capsulating agent to the filtrate reducer to the amphiphobic wettability reversal agent is 100:6-30:120-200:10-50.

4. The composition according to claim 1, wherein in the tackifying and shear improver, $R^1$, $R^{1'}$, $R^2$, $R^{2'}$, $R^5$, $R^{5'}$, $R^4$ and each $R^7$ are independently selected from H and C1-C6 alkyl; $R^3$, $R^6$ and $R^8$ are independently selected from C0-C6 alkylene; n is 1-3.

5. The composition according to claim 4, wherein in the tackifying and shear improver, $R^1$, $R^{1'}$, $R^2$, $R^{2'}$, $R^5$, $R^{5'}$ and $R^4$ are independently selected from H and C1-C4 alkyl; each $R^7$ is independently selected from C1-C6 alkyl; $R^3$ is selected from C0-C4 alkylene; $R^6$ and $R^8$ are independently selected from C1-C6 alkylene.

6. The composition according to claim 5, wherein in the tackifying and shear improver, $R^1$, $R^{1'}$, $R^2$, $R^{2'}$, $R^5$, $R^{5'}$ and $R^4$ are independently selected from H, methyl, ethyl, n-propyl, isopropyl, and n-butyl; each $R^7$ is independently selected from methyl, ethyl, n-propyl, isopropyl, or n-butyl; $R^3$ is selected from C0 alkylene, —$CH_2$—, —$CH_2$—$CH_2$—, —$CH_2$—$CH_2$—$CH_2$—, —$CH(CH_3)$—$CH_2$—, —$CH_2$—$CH(CH_3)$— or —$CH_2$—$(CH_2)_2$—$CH_2$—; $R^6$ and $R^8$ are independently selected from —$CH_2$—, —$CH_2$—$CH_2$—, —$CH_2$—$CH_2$—$CH_2$—, —$CH(CH_3)$—$CH_2$—, —$CH_2$—$CH(CH_3)$—, —$CH_2$—$(CH_2)_2$—$CH_2$—, —$CH_2$—$CH(CH_3)$—$CH_2$—, —$C(CH_3)_2$—$CH_2$—, —$CH_2$—$C(CH_3)_2$—, —$CH_2$—$(CH_2)_3$—$CH_2$—, and —$CH_2$—$(CH_2)_4$—$CH_2$—.

7. The composition according to claim 4, wherein in the tackifying and shear improver, a molar ratio of the structural units represented by formula (1) to the structural units represented by formula (2) to the structural units represented by formula (3) is 10-40:1-10:1;
a weight-average molecular weight of the copolymer is 1,000,000-6,000,000 g/mol.

8. The composition according to claim 7, wherein in the tackifying and shear improver, the molar ratio of the structural units represented by formula (1) to the structural units represented by formula (2) to the structural units represented by formula (3) is 15-30:2-5:1;
the weight-average molecular weight of the copolymer is 2,000,000-5,500,000 g/mol.

9. The composition according to claim 1, wherein in the capsulating agent, $L^1$, $L^{1'}$, $L^2$ and $L^{2'}$ are independently selected from H, methyl, ethyl, n-propyl, isopropyl, and n-butyl.

10. The composition according to claim 1, wherein in the capsulating agent, a weight-average molecular weight of the comb-like polysaccharide compound is 9,000,000-15,000,000 g/mol;
the content of the structural units provided by the compound represented by formula (I) and the compound represented by formula (II) is 80-95 wt. %;
a molar ratio of the structural units provided by the compound represented by formula (I) to the structural units provided by the compound represented by formula (II) is 1:0.2-1.

11. The composition according to claim 10, wherein in the capsulating agent, the weight-average molecular weight of the comb-like polysaccharide compound is 9,500,000-14,500,000 g/mol;
the content of the structural units provided by the compound represented by formula (I) and the compound represented by formula (II) is 85-92 wt. %;
the molar ratio of the structural units provided by the compound represented by formula (I) to the structural units provided by the compound represented by formula (II) is 1:0.2-0.5.

12. The composition according to claim 10, wherein in the capsulating agent, the sulfonated cellulose compound is selected from sulfonated carboxymethyl cellulose, sulfonated hydroxymethyl cellulose, sulfonated carboxyethyl cellulose, sulfonated hydroxyethyl cellulose, sulfonated hydroxypropyl cellulose, and sulfonated hydroxypropyl methyl cellulose.

13. The composition according to claim 1, wherein the nanocrystalline cellulose has an average particle size of 100-600 nm;
the nanocrystalline cellulose is in a rod form.

14. The composition according to claim 1, wherein in formula (a), each $R_1$ is independently selected from C1-C4 alkyl, each $R_2$ is independently selected from H and C1-C4 alkyl, each $R_3$ is independently selected from C2-C8 alkylene, each n" is independently selected from 4-10, and m is 2-8.

15. The composition according to claim 14, wherein in formula (a), each $R_1$ is independently selected from methyl, ethyl, n-propyl, isopropyl, and n-butyl, each $R_2$ is independently selected from H, methyl, ethyl, n-propyl, isopropyl, and n-butyl, each $R_3$ is independently selected from —$CH_2$—$CH_2$—, —$CH_2$—$CH_2$—$CH_2$—, —$CH(CH_3)$—$CH_2$—, —$CH_2$—$CH(CH_3)$—, —$CH_2$—$(CH_2)_2$—$CH_2$—, —$CH_2$—$(CH_2)_3$—$CH_2$—, and —$CH_2$—$(CH_2)_4$—$CH_2$—, each n" is independently selected from 4-8, and m is 3-6.

16. The composition according to claim 15, wherein formula (a) is one of the following cations:
formula (a-1): $R_1$ is methyl, $R_2$ is H, $R_3$ is —$CH_2$—$CH_2$—$CH_2$—, n" is 4, and m is 4;
formula (a-2): in formula (a), $R^1$ is methyl, $R_2$ is H, $R_3$ is —$CH_2$—$CH_2$—$CH_2$—, n" is 6, and m is 4;
formula (a-3): in formula (a), $R_1$ is methyl, $R_2$ is H, $R_3$ is —$CH_2$—$CH_2$—$CH_2$—, n" is 8, and m is 4;
formula (a-4): in formula (a), $R_1$ is methyl, $R_2$ is H, $R_3$ is —$CH_2$—$CH_2$—$CH_2$—, n" is 4, and m is 6.

17. A water-based drilling fluid containing the composition according to claim 1.

18. The water-based drilling fluid according to claim 17, wherein based on 100 pbw of water in the water-based drilling fluid, the content of the composition is 3-15 pbw.

19. The water-based drilling fluid according to claim 17, wherein the water-based drilling fluid is a brine drilling fluid, and, based on 100 pbw of water in the water-based drilling fluid, the content of the salt as a weighting agent is 5-10 pbw.

* * * * *